(12) United States Patent
Yohannes et al.

(10) Patent No.: US 11,639,093 B2
(45) Date of Patent: *May 2, 2023

(54) POWERTRAIN

(71) Applicant: Textron Innovations Inc., Providence, RI (US)

(72) Inventors: Zekarias W. Yohannes, Augusta, GA (US); Matthew Wilson, Augusta, GA (US); David A. Smith, Augusta, GA (US)

(73) Assignee: Textron Innovations Inc., Providence, RI (US)

( * ) Notice: Subject to any disclaimer, the term of this patent is extended or adjusted under 35 U.S.C. 154(b) by 224 days.

This patent is subject to a terminal disclaimer.

(21) Appl. No.: 17/115,271

(22) Filed: Dec. 8, 2020

(65) Prior Publication Data
US 2021/0086604 A1 Mar. 25, 2021

Related U.S. Application Data

(63) Continuation of application No. 16/411,617, filed on May 14, 2019, now Pat. No. 10,889,173, which is a
(Continued)

(51) Int. Cl.
*B60K 5/00* (2006.01)
*B60K 5/04* (2006.01)
(Continued)

(52) U.S. Cl.
CPC .............. *B60K 5/04* (2013.01); *B60K 5/1208* (2013.01); *B60K 17/04* (2013.01); *F16H 57/025* (2013.01);
(Continued)

(58) Field of Classification Search
CPC ........ B60K 5/04; B60K 5/1208; B60K 17/04; F16H 57/025
See application file for complete search history.

(56) References Cited

U.S. PATENT DOCUMENTS 3,497,025 A 2/1970 Rosenkrands
4,903,545 A 2/1990 Louis et al.
(Continued)

OTHER PUBLICATIONS

The pictures are 'pictures of golf cart drivetrain having an engine connected to a transaxle'. These were taken during an offer for sale by a 3rd party, Mike Major of Advanced Datum Inc, on Aug. 31, 2018.
(Continued)

*Primary Examiner* — Hau V Phan
(74) *Attorney, Agent, or Firm* — Sandberg Phoenix & von Gontard, PC

(57) ABSTRACT

A transaxle system for a golf car, wherein the system comprises a transaxle and a mating interface. The transaxle comprises a plurality of mounting flanges fixedly mountable to at least one axle tube of the golf car, wherein the at least one axle tube houses at least one wheel axle, and the transaxle is operably couplable to the at least one wheel axle. The transaxle additionally comprising a transaxle mounting collar that is fixedly mounted to or integrally formed with a housing of the transaxle. The mating interface is mountable to the transaxle mounting collar, and is structured and operable to have an integrated internal combustion engine-transmission unit of the golf car mounted thereto.

19 Claims, 18 Drawing Sheets

Related U.S. Application Data continuation-in-part of application No. 16/135,406, filed on Sep. 19, 2018, now Pat. No. 10,589,623.

(51) Int. Cl.
*F16H 57/025* (2012.01)
*B60K 17/04* (2006.01)
*B60K 5/12* (2006.01)
*F16H 57/02* (2012.01)

(52) U.S. Cl.
CPC ............... *B60K 2005/003* (2013.01); *F16H 2057/02052* (2013.01)

(56) References Cited

U.S. PATENT DOCUMENTS

| | | | |
|---|---|---|---|
| 4,932,209 A | 6/1990 | Okada et al. | |
| 5,042,870 A | 8/1991 | Yura | |
| 5,305,848 A | 4/1994 | Akutagawa et al. | |
| 5,460,236 A | 10/1995 | Lewis et al. | |
| 6,122,996 A | 9/2000 | Hauser et al. | |
| 6,253,637 B1 * | 7/2001 | Hauser | F16H 57/02 60/487 |
| 6,390,224 B1 | 5/2002 | Yoshida | |
| 7,131,267 B1 * | 11/2006 | Keller | F16H 59/68 180/305 |
| 7,370,886 B2 | 5/2008 | Luttinen et al. | |
| 7,454,907 B1 * | 11/2008 | Hauser | B60K 17/105 60/494 |
| 7,836,999 B2 | 11/2010 | Kato | |
| 8,196,696 B2 | 6/2012 | Karube et al. | |
| 8,443,598 B1 * | 5/2013 | Hauser | F04B 1/24 60/484 |
| 8,857,554 B1 | 10/2014 | Keller | |
| 9,045,163 B2 * | 6/2015 | Theodore | B60K 6/50 |
| 9,114,798 B1 * | 8/2015 | Fox | F16H 61/435 |
| 10,589,623 B1 * | 3/2020 | Yohannes | B60K 1/00 |
| 10,889,173 B2 * | 1/2021 | Yohannes | B60K 5/1208 |
| 11,040,617 B2 * | 6/2021 | Yohannes | B60K 5/12 |
| 2004/0118627 A1 | 6/2004 | Ohtsuki et al. | |
| 2006/0283654 A1 | 12/2006 | Krisher | |
| 2011/0312460 A1 | 12/2011 | Nett et al. | |
| 2012/0175863 A1 | 7/2012 | Theodore | |
| 2013/0152570 A1 | 6/2013 | Hoshinova et al. | |
| 2016/0355054 A1 | 12/2016 | Jensen et al. | |
| 2017/0045126 A1 | 2/2017 | Kluck et al. | |
| 2018/0259052 A1 * | 9/2018 | Chinitz | B60K 17/346 |
| 2020/0086740 A1 | 3/2020 | Yohannes et al. | |

OTHER PUBLICATIONS

The website link http://www.boulderengines.com/ (attached pics of the website homepage) was in operation at least as early as Aug. 2018, and the installation manual was downloaded from the website.

Boulder Engines Installation Manual from http://www.boulderengines.com/.

* cited by examiner

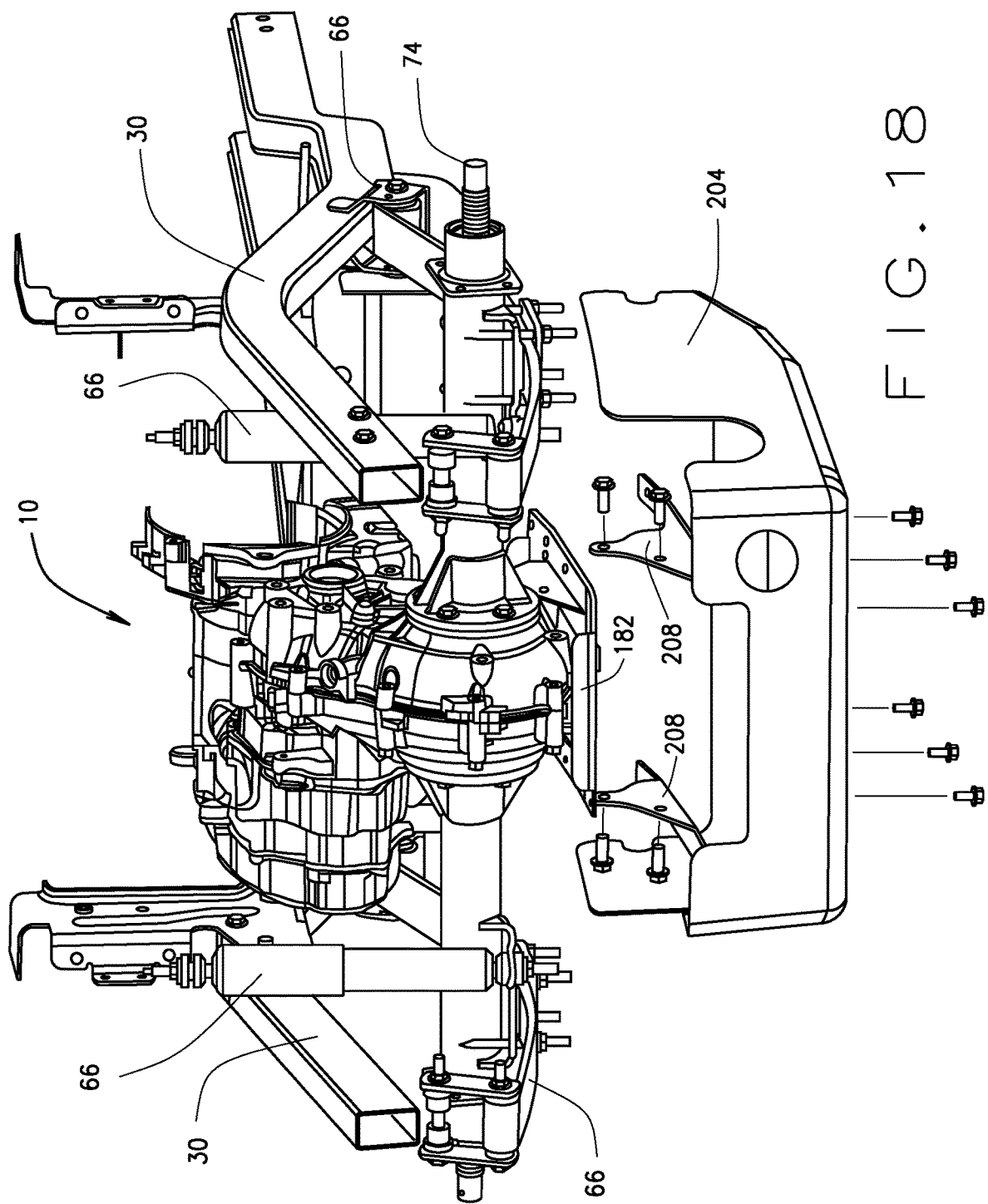

POWERTRAIN

CROSS-REFERENCE TO RELATED APPLICATIONS

This application is a continuation of U.S. patent application Ser. No. 16/411,617 filed on May 14, 2019, which is a continuation-in-part of U.S. patent application Ser. No. 16/135,406 filed on Sep. 19, 2018. The disclosure of which is incorporated herein by reference in its entirety.

FIELD

The present teachings relate to powertrains for lightweight utility vehicles, e.g., golf cars.

BACKGROUND

The statements in this section merely provide background information related to the present disclosure and may not constitute prior art.

A traditional known approach to gas powertrain design is to mount the gas or diesel engine and transaxle to the vehicle chassis/frame structure or other vehicle structure independently. Other known designs utilize a common platform such as a tray or pan connected to the vehicle chassis/frame structure or other vehicle structure to mount the engine and transaxle to the vehicle. In both instances, power is transferred from the engine power take off (e.g., output shaft) to the transaxle input shaft via external clutches (e.g., a continuously variable transmission (CVT)) connected to the engine and/or transaxle via a CVT belt. For example, in various traditional powertrain designs the engine is mounted to the vehicle using an isolator on the vehicle chassis and the same is done to mount the transaxle. With such isolator mounted configurations, it is critical to keep the CVT clutches' center distance fixed. This requirement is crucial for a predictable CVT system performance.

Such known designs generally include many parts and components that increase costs and are known to generate significant undesirable engine and powertrain vibration that is transmitted to the vehicle.

SUMMARY

In various embodiments, the present disclosure provides a transaxle system for a golf car, wherein the system comprises a transaxle and a mating interface. The transaxle comprises a plurality of mounting flanges fixedly mountable to at least one axle tube of the golf car, wherein the at least one axle tube houses at least one wheel axle, and the transaxle is operably couplable to the at least one wheel axle. The transaxle additionally comprising a transaxle mounting collar that is fixedly mounted to or integrally formed with a housing of the transaxle. The mating interface is mountable to the transaxle mounting collar, and is structured and operable to have an integrated internal combustion engine-transmission unit of the golf car mounted thereto.

In various other embodiments, the present disclosure provides a unitized powertrain for a golf car, wherein the unitized powertrain comprises an integrated internal combustion engine-transmission unit, an integrated transaxle-mounting collar unit, and a mating interface. In various instances, the integrated transaxle-mounting collar unit comprises a transaxle and a plurality of mounting flanges connected to the transaxle and fixedly mountable to at least one axle tube of the golf car, wherein the at least one axle tube houses at least one wheel axle, and the transaxle is operably couplable to the at least one wheel axle. The transaxle-mounting collar unit additionally comprises a transaxle mounting collar that is fixedly mounted to or integrally formed with a housing of the transaxle-mounting collar unit. The unitized powertrain additionally comprises a mating interface that comprises a mounting plate to which the transaxle mounting collar is mounted and a sidewall extending from the mounting plate, wherein the sidewall includes a mounting face disposed along a distal edge thereof to which the internal combustion engine-transmission unit is mounted.

In various other embodiment the present disclosure provides a golf car that comprises a chassis, a plurality of golf car suspension components connected to the chassis, a drive axle assembly including at least one wheel axle and at least one axle tube housing the at least one wheel axle. The at least one axle tube is connected to the suspension components such that the at least one axle assembly is operably connected to the golf car chassis via the golf car suspension components. The golf car additionally comprises a unitized powertrain that comprises an integrated internal combustion engine-transmission unit, an integrated transaxle-mounting collar unit, and a mating interface. In various instances, the integrated transaxle-mounting collar unit comprises a transaxle and a plurality of mounting flanges connected to the transaxle and fixedly mounted to the at least one axle tube, and the transaxle is operably coupled to the at least one wheel axle. The transaxle-mounting collar unit additionally comprises a transaxle mounting collar that is fixedly mounted to or integrally formed with a housing of the transaxle-mounting collar unit. The unitized powertrain additionally comprises a mating interface that comprises a mounting plate to which the transaxle mounting collar is mounted and a sidewall extending from the mounting plate, wherein the sidewall includes a mounting face disposed along a distal edge thereof to which the internal combustion engine-transmission unit is mounted.

This summary is provided merely for purposes of summarizing various example embodiments of the present disclosure so as to provide a basic understanding of various aspects of the teachings herein. Various embodiments, aspects, and advantages will become apparent from the following detailed description taken in conjunction with the accompanying drawings which illustrate, by way of example, the principles of the described embodiments. Accordingly, it should be understood that the description and specific examples set forth herein are intended for purposes of illustration only and are not intended to limit the scope of the present teachings.

DRAWINGS

The drawings described herein are for illustration purposes only and are not intended to limit the scope of the present teachings in any way.

FIG. 18 is a rear isometric view of the at least one noise suppression pan of the vehicle, in accordance with various embodiments of the present disclosure.

Corresponding reference numerals indicate corresponding parts throughout the several views of drawings.

DETAILED DESCRIPTION

Figure 1:
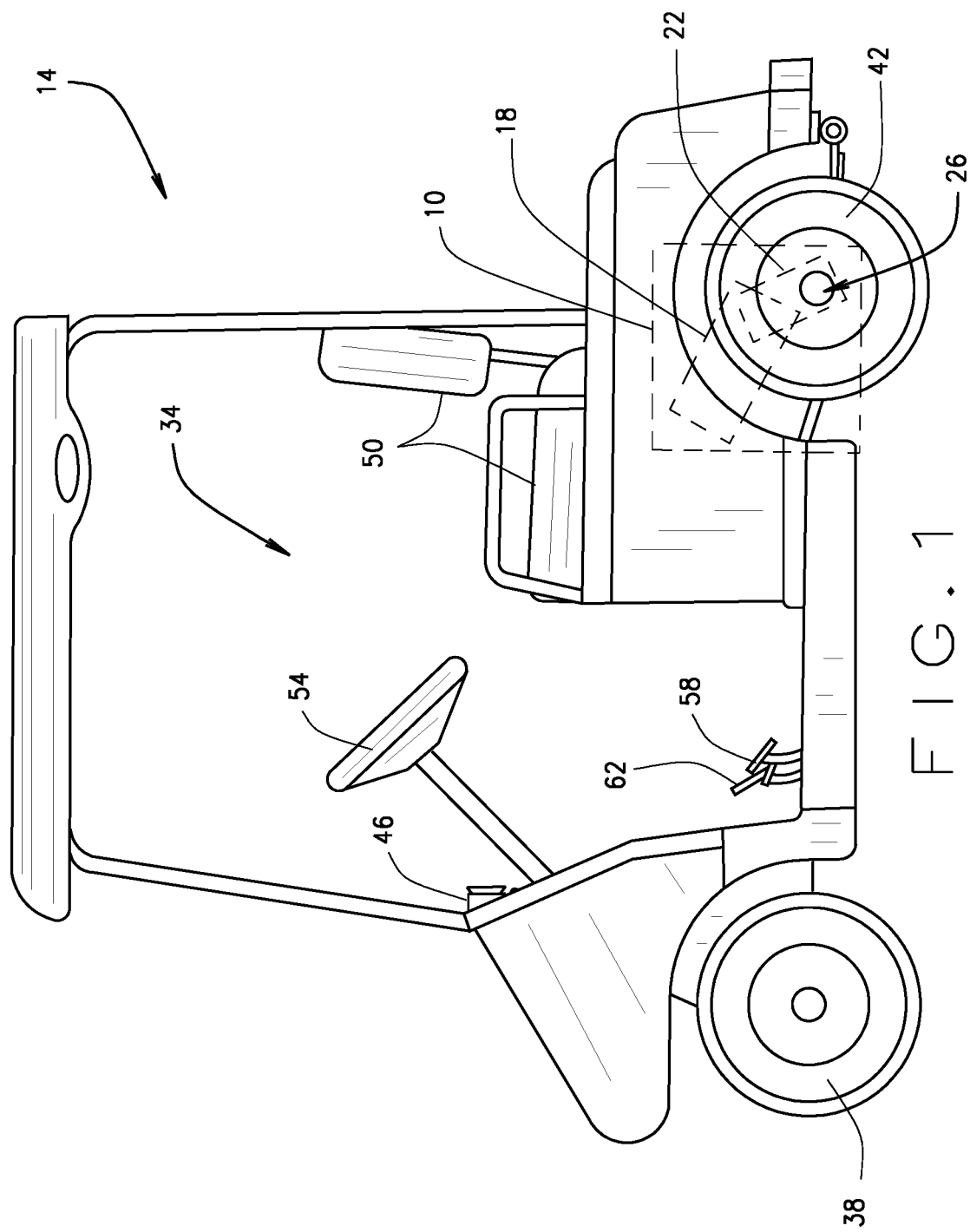
FIG. 1 is a side view of an exemplary vehicle including a unitized powertrain, in accordance with various embodiments of the present disclosure.

The following description is merely exemplary in nature and is in no way intended to limit the present teachings, application, or uses. Throughout this specification, like reference numerals will be used to refer to like elements. Additionally, the embodiments disclosed below are not intended to be exhaustive or to limit the invention to the precise forms disclosed in the following detailed description. Rather, the embodiments are chosen and described so that others skilled in the art can utilize their teachings. As well, it should be understood that the drawings are intended to illustrate and plainly disclose presently envisioned embodiments to one of skill in the art, but are not intended to be manufacturing level drawings or renditions of final products and may include simplified conceptual views to facilitate understanding or explanation. As well, the relative size and arrangement of the components may differ from that shown and still operate within the spirit of the invention.

As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims.

Unless otherwise defined, all technical and scientific terms used herein have the same meaning as commonly understood by one of ordinary skill in the art to which this disclosure belongs. The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps can be employed.

When an element, object, device, apparatus, component, region or section, etc., is referred to as being "on," "engaged to or with," "connected to or with," or "coupled to or with" another element, object, device, apparatus, component, region or section, etc., it can be directly on, engaged, connected or coupled to or with the other element, object, device, apparatus, component, region or section, etc., or intervening elements, objects, devices, apparatuses, components, regions or sections, etc., can be present. In contrast, when an element, object, device, apparatus, component, region or section, etc., is referred to as being "directly on," "directly engaged to," "directly connected to," or "directly coupled to" another element, object, device, apparatus, component, region or section, etc., there may be no intervening elements, objects, devices, apparatuses, components, regions or sections, etc., present. Other words used to describe the relationship between elements, objects, devices, apparatuses, components, regions or sections, etc., should be interpreted in a like fashion (e.g., "between" versus "directly between," "adjacent" versus "directly adjacent," etc.).

As used herein, the term "and/or" includes any and all combinations of one or more of the associated listed items. For example, A and/or B includes A alone, or B alone, or both A and B.

Although the terms first, second, third, etc. can be used herein to describe various elements, objects, devices, apparatuses, components, regions or sections, etc., these elements, objects, devices, apparatuses, components, regions or sections, etc., should not be limited by these terms. These terms may be used only to distinguish one element, object, device, apparatus, component, region or section, etc., from another element, object, device, apparatus, component, region or section, etc., and do not necessarily imply a sequence or order unless clearly indicated by the context.

Moreover, it will be understood that various directions such as "upper", "lower", "bottom", "top", "left", "right", "first", "second" and so forth are made only with respect to explanation in conjunction with the drawings, and that components may be oriented differently, for instance, during transportation and manufacturing as well as operation. Because many varying and different embodiments may be made within the scope of the concept(s) taught herein, and because many modifications may be made in the embodiments described herein, it is to be understood that the details herein are to be interpreted as illustrative and non-limiting.

Referring now to FIG. 1, the present disclosure generally provides a powertrain 10 for a lightweight vehicle 14, such as a golf car. The powertrain 10 generally comprises a prime mover 18 (e.g., an internal combustion engine, an electric motor, or any other device structured and operable to deliver power/torque/motive force) that is fixedly mounted to a transaxle 22 that is fixedly mounted to an axle assembly 26. In various embodiments of the present disclosure, the powertrain 10 can be a 'unitized' powertrain wherein the prime mover 18 and transaxle 22 are coupled together utilizing a mounting collar 78 to form a single unit or unitized powertrain, as described further below. In various embodiments of the present disclosure the powertrain 10 can be a 'floating' powertrain, wherein the prime mover 18 and transaxle 22 are coupled together utilizing the mounting collar 78 to form a single or unitized powertrain that is mounted only to the axle assembly 26 absent any other structure for connecting the powertrain 10 to the vehicle 14, as described below. Alternatively, in various embodiments, the unitized powertrain 10 can be mounted at a rear end to the axle assembly 26 and supported at a front end by one or more isolator mount, such as isolator mounts 146 illustrated in and described with regard to FIGS. 14 and 15.

In some embodiments the unitized powertrain 10 encloses the moving components (e.g. the prime mover output shaft 98', the transaxle input shaft 102, gears, chains, belts, and any other moving components configured to transmit power from the prime mover-transmission unit 18' to the one or more rear axle 74) from the outside environment. Particularly the transaxle 22 comprises a left and right (relative to the lateral or side-to-side-direction of the vehicle 14) housing sealed together (e.g. via gaskets not shown), the prime mover-transmission unit 18' seals together with either a mating surface of the transaxle/mounting collar 22/86 or a surface of the mating interface 150 which seals to the mating surface of the transaxle/mounting collar 22/86.

The vehicle 14 generally includes a passenger compartment 34, one or more front wheels 38 operationally connected to the chassis or other frame structure 30, one or more rear wheels 42 operationally connected to the axle assembly 26, and the powertrain 10. The passenger compartment 34 generally includes the dash/instrument console 46, a seating structure 50 structured and operable to provide seating for one or more vehicle occupants, a steering wheel 54 for use by the vehicle operator to control the directional movement of the vehicle 14, a brake pedal 58 for use by the vehicle operator to control slowing and stopping of the vehicle 14, and an accelerator pedal 62 for use by the vehicle operator to control the torque/power delivered by the prime mover 18 to one or more of the rear and/or front wheels 42 and/or 38. In various embodiments, the seating structure 50 can include at least one row of a side by side passenger seating arrangement.

Although the vehicle 14 is exemplarily illustrated as a golf car throughout the various figures, it should be understood that in various embodiments, the vehicle 14 can be a maintenance vehicle, a cargo vehicle, a shuttle vehicle, an all-terrain vehicle (ATV), a utility-terrain vehicle (UTV), a worksite vehicle, a buggy, any lightweight vehicle, or any other suitable type of utility or low-speed vehicle that is not designated for use on roadways, and remain within the scope of the present disclosure.

Additionally, although the powertrain 10 of the present disclosure will, by way of example, be shown and described herein as structured and operable to deliver motive force to the rear wheel(s) 42, via the axle assembly 26 (shown by way of example as a rear axle assembly), it should be understood that, in various embodiments, the powertrain 10 of the present disclosure can be structured and operable to deliver motive force to the front wheel(s) 38, via a front axle assembly (not shown), and remain within the scope of the present disclosure. In yet other embodiments, it is envisioned that powertrain 10, as described herein can be implemented in a four-wheel drive vehicle including a power take off assembly (not shown) operably connected to the transaxle 22 to deliver motive force from the prime mover 18 to one or more of the front wheel(s) 38 and/or rear wheel(s) 42.

Figure 2:
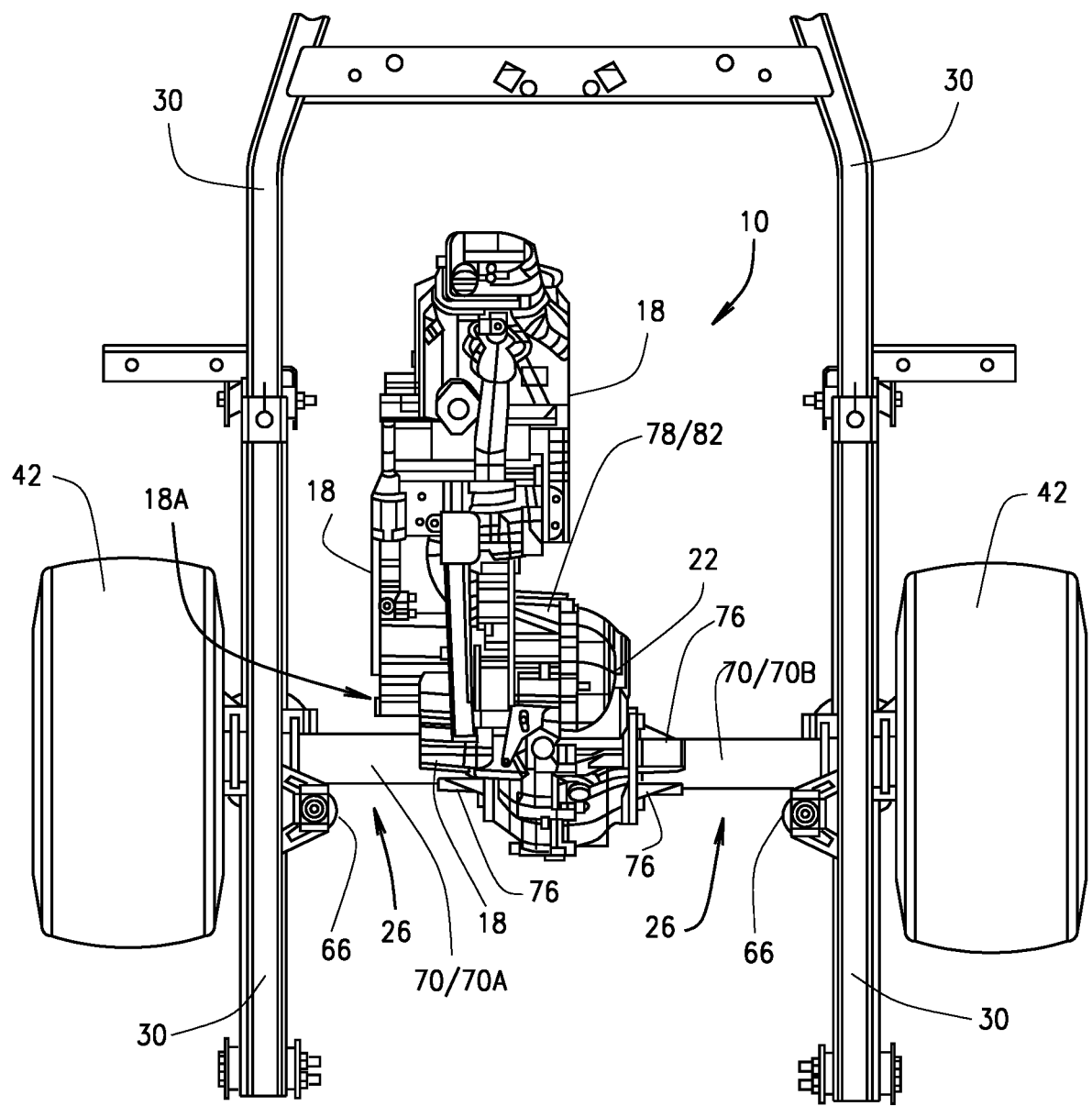
FIG. 2 is a top view of a portion of a vehicle chassis/frame of the vehicle shown in FIG. 1 having an axle assembly connected thereto, and wherein the unitized powertrain is a 'floating' powertrain fixedly and operationally connected to the axle assembly, in accordance with various embodiments of the present disclosure.
Figure 3:
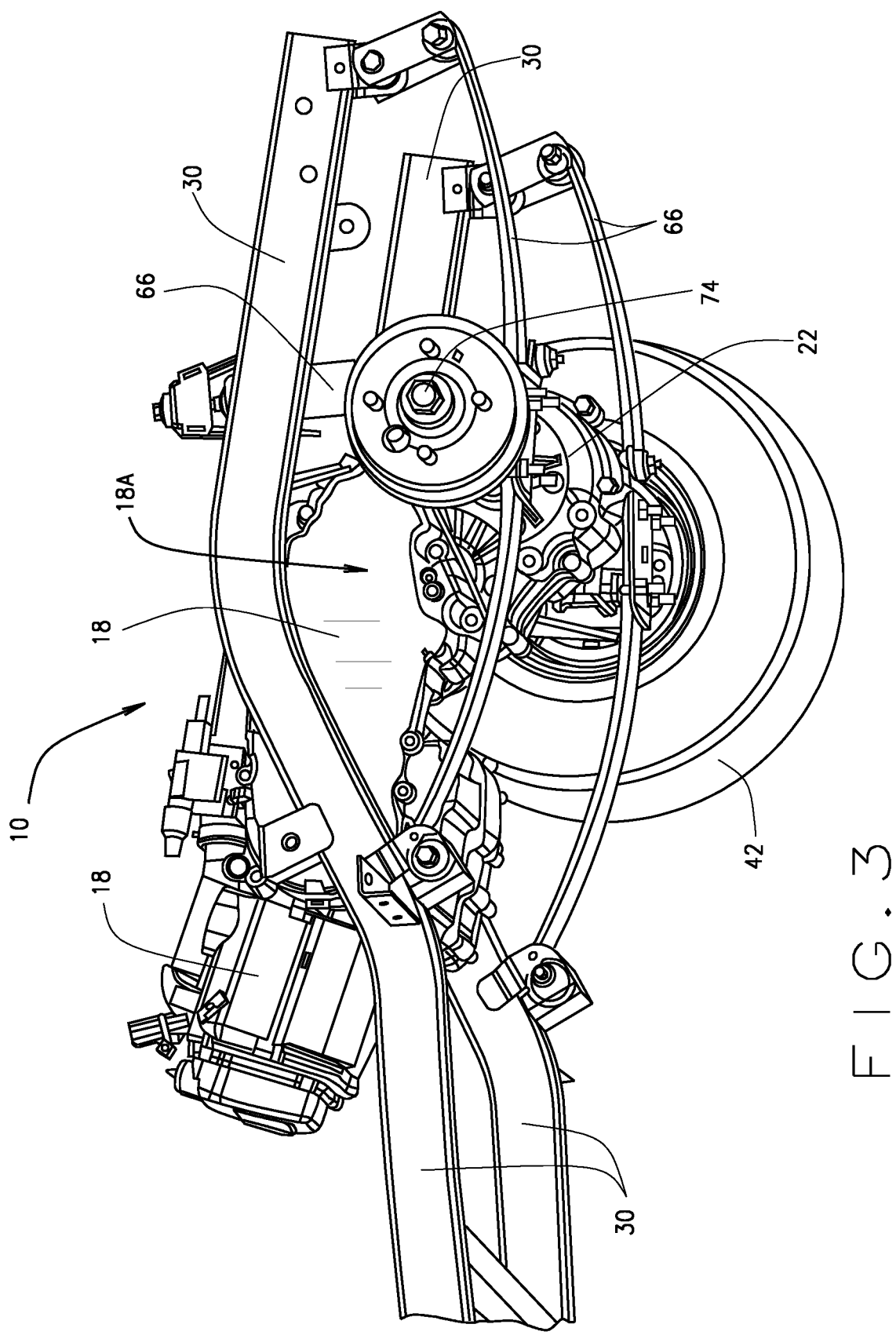
FIG. 3 is an isometric view showing the axle assembly connected the vehicle chassis/frame via only two or more suspension components (e.g., leaf springs and/or shocks) such that the 'floating' powertrain is operationally connected to the chassis/frame, and hence the respective vehicle, via only the suspension components, in accordance with various embodiments of the present disclosure.
Figure 4:
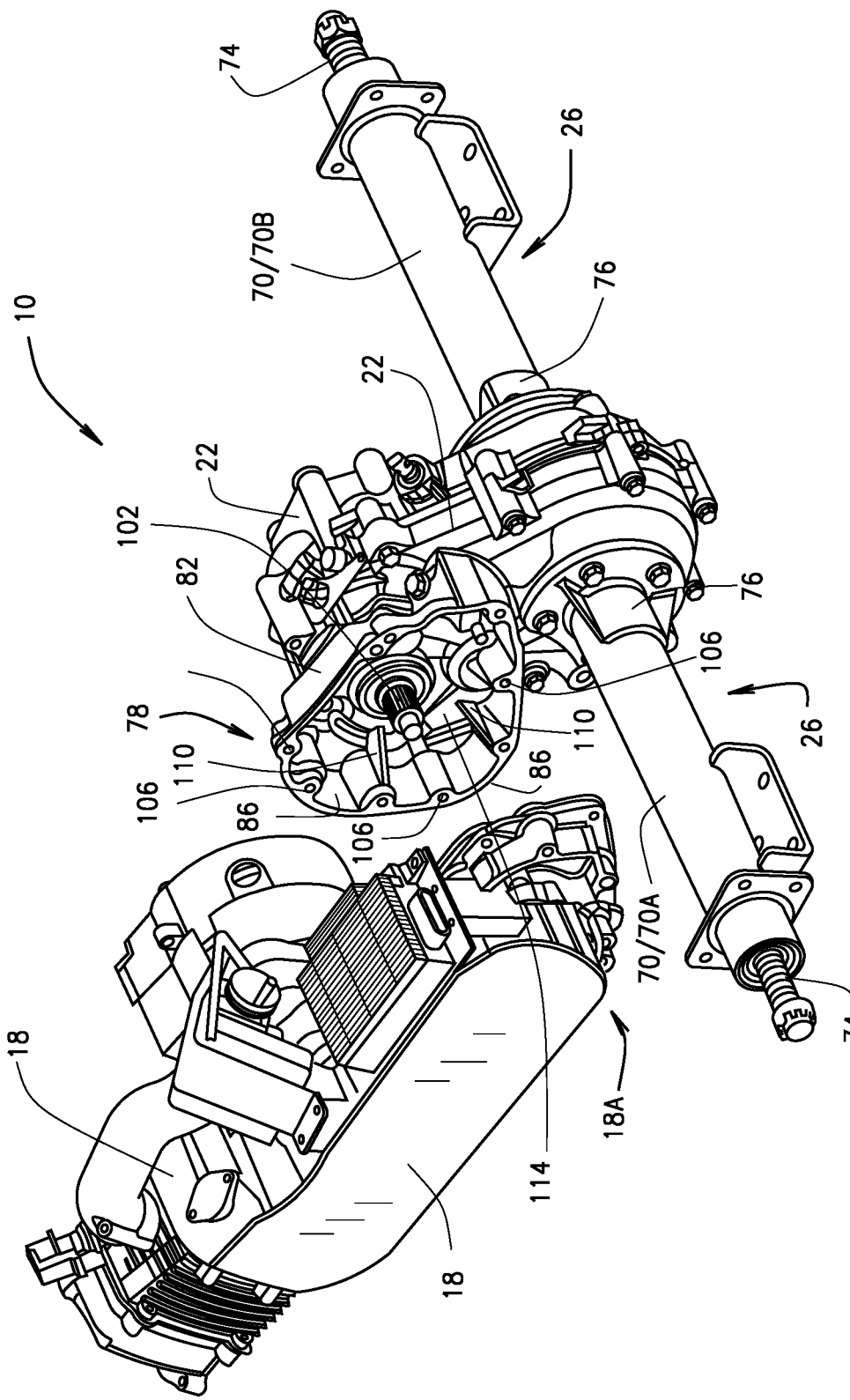
FIG. 4 is a partially exploded view of the 'floating' powertrain mounted to the axle assembly showing a transaxle mounting collar mounted to or integrally forms with the transaxle to which the prime mover can be mounted and cantilevered therefrom, in accordance with various embodiments of the present disclosure.
Figure 5:
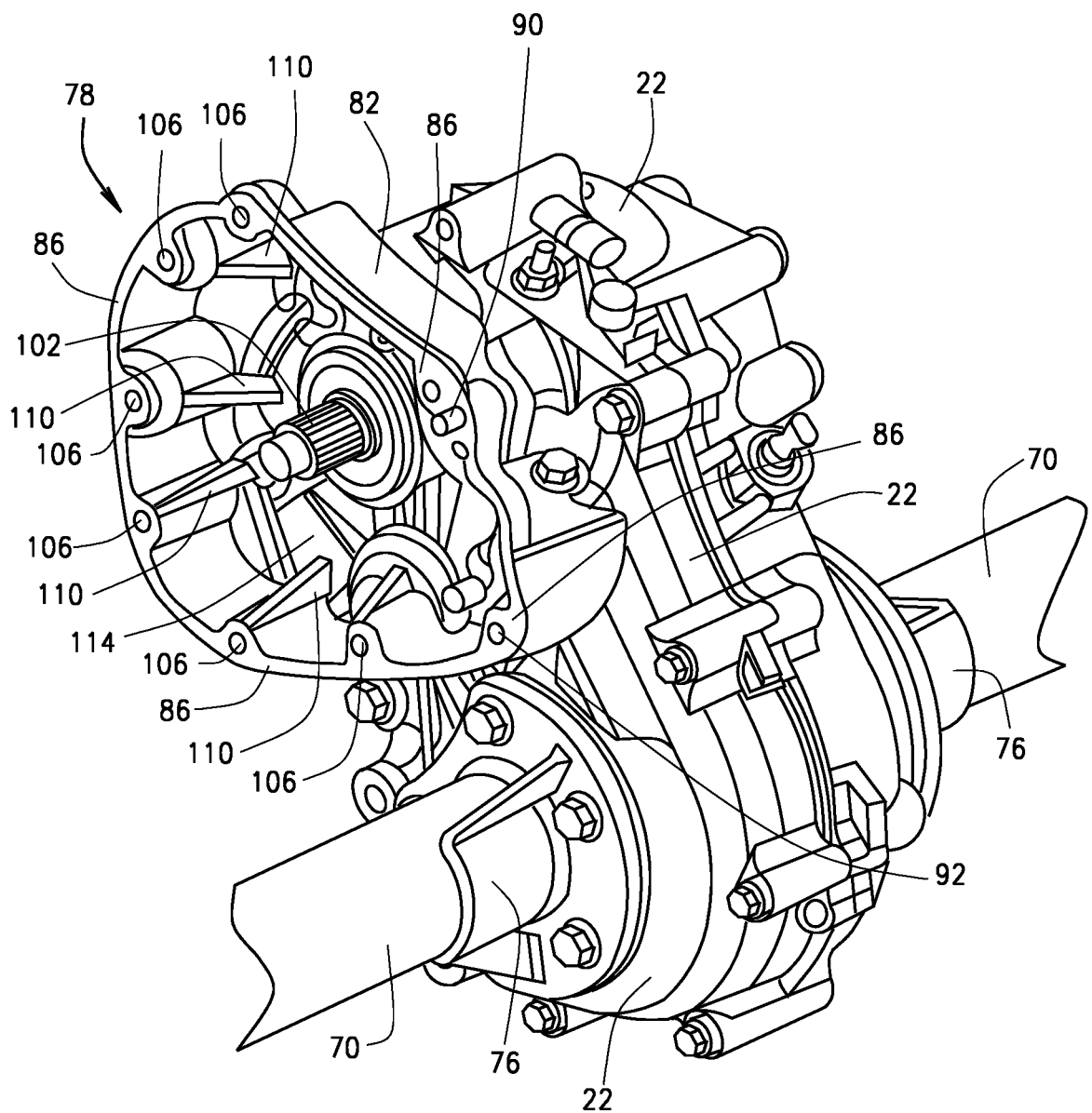
FIG. 5 is an isometric view of the transaxle and transaxle mounting collar, in accordance with various embodiments of the present disclosure.
Figure 6:
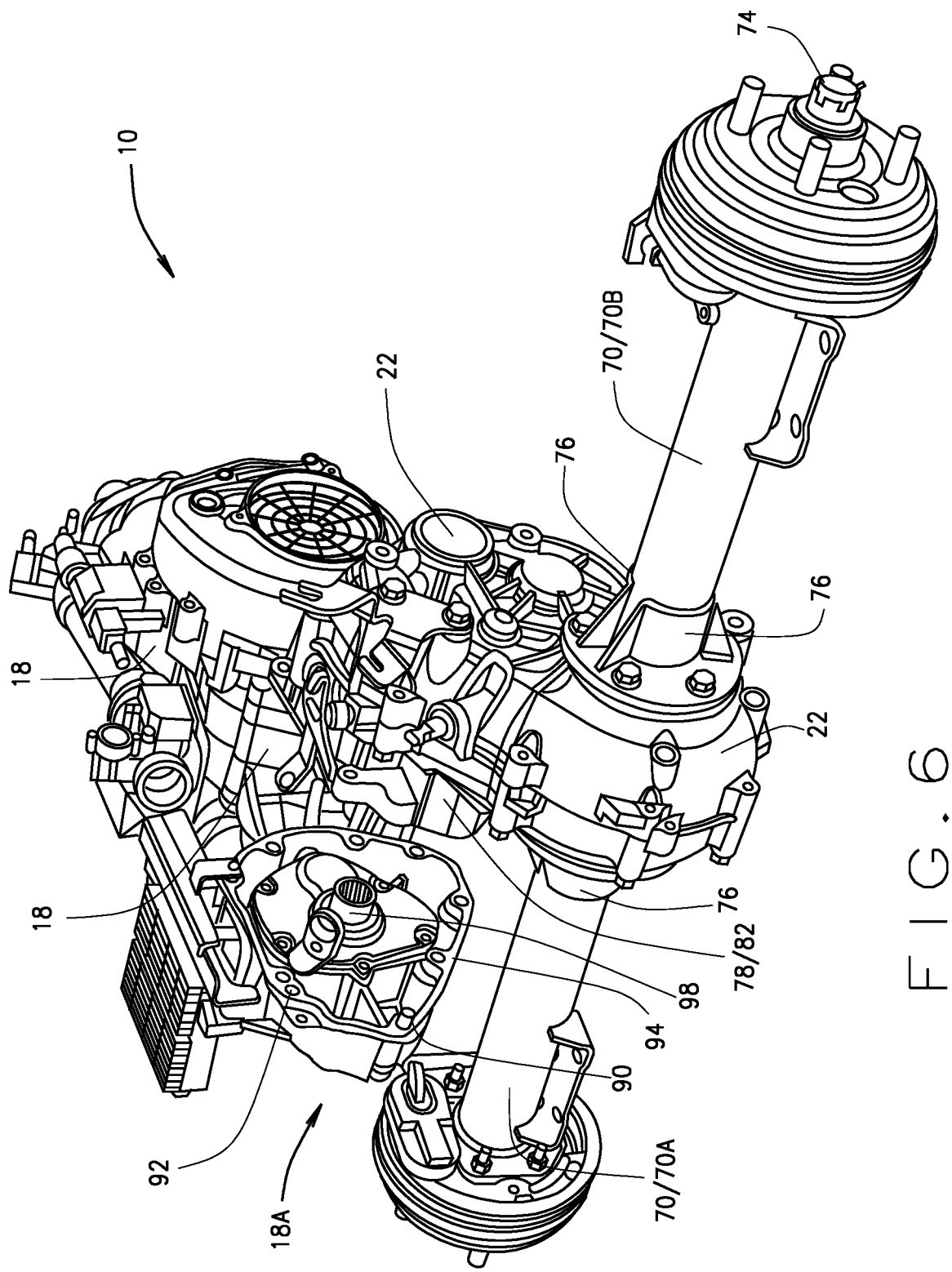
FIG. 6 is a partially exploded view of the 'floating' powertrain mounted to the axle assembly showing an output shaft of the prime mover, in accordance with various embodiments of the present disclosure.

Referring now to FIGS. 2, 3 and 4, as described above, in various embodiments the powertrain 10 can be a 'floating' powertrain for the vehicle 14, e.g., a golf car. In such embodiments, the powertrain 10 comprises the prime mover 18 (e.g., an internal combustion engine, an electric motor, or any other device structured and operable to deliver power/torque/motive force) that is fixedly mounted to and cantilevered from (e.g., suspended from) the transaxle 22, via the mounting collar 78, and the transaxle 22 is mounted only to the axle assembly 26 absent any other structure for connecting the transaxle 22 and prime mover 18 to the vehicle 14. More specifically, the prime mover 18 is only operationally connected (e.g., indirectly connected) to the vehicle chassis and/or frame structure 30 through its connection and mounting to the transaxle 22, via the mounting collar 78.

The axle assembly 26 is connected to the chassis/frame 30 via two or more vehicle suspension components 66 (e.g., two or more springs (e.g., leaf springs, coil springs, etc.), and/or shocks, and/or struts, and/or spring/strut combinations, etc.). The suspension components 66 are mounted to one or more axle tube 70 of the axle assembly 26 and to the vehicle frame/chassis 30, thereby connecting the axle assembly 26 with the chassis/frame 30. The axle assembly 26 additionally includes one or more wheel axle 74 disposed within, and housed by, the axle tube(s) 70. In some embodiments, the axle tube(s) 70 can comprise a left axle tube 70A and a right axle tube 70B that are different lengths such that the transaxle 22 is mounted to the axle tubes 70A and 70B offset to the left or right of a longitudinal center axis LCA (shown in FIG. 13) of the vehicle 14. For example, as exemplarily illustrated in FIG. 13, in various instances the right axle tube 70B can be shorter than the left axle tube 70A such that the transaxle 22 is mounted to the axle tubes 70A and 70B offset to the right (e.g., toward the passenger's (non-driver) side of the vehicle 14) of the longitudinal center axis LCA of the vehicle 14. Alternatively, in various embodiments, the left and right axle tubes are approximately the same length such that the transaxle 22 is mounted to the axle tubes 70A and 70B approximately centered in the lateral or width direction of the vehicle 14, e.g., centered along the longitudinal center axis LCA.

The wheels (e.g., the front wheels 38 or the rear wheels 42) are mounted to distal ends of the wheel axle(s) 74. The transaxle 22 is fixedly mounted to the axle tube(s) 70 and operationally connected to the wheel axle(s) 74. In various embodiments, the transaxle 22 can be fixedly mounted to the axle tube(s) 70 via a plurality (e.g., 2 or more) mounting flanges 76.

As described above, the prime mover 18 is fixedly mounted to the transaxle mounting collar 78, which is connected to or integrally formed with the transaxle 22 (e.g., the mounting collar 78 is connected to or integrally formed with a housing of the transaxle 22). In the various floating powertrain embodiments, other than the mounting collar 78 for connecting the prime mover 18 to the transaxle 22, there is no other support structure or means provided to connect and support the prime mover 18 to and within the vehicle 14. Specifically, the axle assembly 26 is connected to the chassis/frame 30 via the suspension components 66, the transaxle 22 is mounted to the axle tube(s) 70, the mounting collar 78 is connected to or integrally formed with the transaxle 22, and the prime mover 18 is mounted to the mounting collar 78 such that the prime mover 18 is cantilevered from (e.g., suspended from) the mounting collar 78. That is, the prime mover 18 is only operationally connected (e.g., indirectly connected) to the vehicle chassis/frame structure 30 (as best shown in FIGS. 2 and 3) through its connection and mounting to the transaxle 22 (via the mounting collar 78). Hence, in such embodiments, the suspension components 66 provide the only elements, components, structure, or means by which the axle assembly 26, the transaxle 22 and ultimately the prime mover 18 are mounted to and within the vehicle 14, and thereby provide the only support, torque path and vibration path for the 'floating' prime mover 18. The prime mover 18 is operationally connected to the transaxle 22 and the transaxle is operationally connected to the wheel axle(s) 74 such that operation of the prime mover 18 provides power and torque, via the transaxle 22, to the wheel axle(s) 74 to thereby provide motive power to the vehicle 14.

Referring now to FIGS. 3, 4, 5, and 6, as described above, in various embodiments, the mounting collar 78 is structured and operable to connect or mount the prime mover 18 to the transaxle 22, which is mounted to the axle assembly 26. And, the axle assembly 26 is in turn connected or mounted to the chassis/frame 30 via the suspension components 66. Therefore, other than the connection of the axle assembly 26 to the chassis/frame 30 via the suspension components 66, there is no other support structure or means provided to connect and support the prime mover 18 to and within the vehicle 14. Accordingly, that the prime mover 18 is cantilevered from (e.g., suspended from) the mounting collar 78, and the powertrain 10 (e.g., prime mover 18 plus the transaxle 22) is cantilevered from axle assembly 26 absent any structure for mounting the prime mover 18 to the vehicle 14—other than the suspension components 66.

The mounting collar 78 is sized, shaped, structured and operable to connected to a proximal end 18A of the prime mover 18 and thereby support and carry the load acting on the prime mover 18 as the prime mover 18 and vehicle 14 are operated. The load acting on the prime mover 18 will be readily and easily understood by one skilled in the art to comprise the weight and mass of the prime mover 18, torque generated by the prime mover 18 during operation thereof, the moment forces (e.g., force vectors), vibrations, jarring, jolting impacts, etc., acting on the prime mover 18 as the prime mover 18 and vehicle 14 are operated, and any other force acting on prime mover 18 or generated by the prime mover 18 that will be imparted on, translated to or transferred to the mounting collar 78 (and hence, on/to the transaxle 22, the axle assembly 26, and the suspension components 66) both when the prime mover 18 and/or vehicle 14 are in operation, and when the prime mover 18 and/or vehicle 14 are not operating or are stationary or at rest.

Specifically, the mounting collar 78 comprises a sidewall 82 having a transaxle mounting face 84 formed along a proximal edge thereof to which the transaxle 22 can be mounted, and a prime mover mounting face 86 formed along an opposing distal edge thereof to which the prime mover 18 can be mounted. As described further below, the prime mover mounting face 86 has a surface area sized and shaped to support the cantilevered prime mover 18, and bear the load(s) exerted thereby and thereon, absent any additional structure for mounting the prime mover 18 to the vehicle 14. Particularly, as one skilled in the art will readily and easily understand, the larger the surface area of the prime mover mounting face 86, the more the load(s) exerted by and on the prime mover 18 will be distributed across that surface area of the prime mover mounting face 86. Hence, the larger the surface area of the mounting face 86, the greater load(s) the mounting collar 78 will support and bear. Therefore, the size and shape of the surface area of the mounting face 86 (e.g., circumferential length, shape and width of the mounting face 86) is dependent on the size and weight/mass of the prime mover 18 and the load(s) generated by and acting on the prime mover 18.

The prime mover 18 comprises a collar mounting face 94 that contacts the mounting collar prime mover mounting face 86 when the prime mover 18 is mounted to the transaxle 22, via the mounting collar 78. In various embodiments, the prime mover 18 can be securely mounted to the mounting collar 78 using a plurality of bolts (not shown) inserted through a plurality of bolt holes or channels 106 formed in the mounting collar 78. Alternatively, in various embodiments, the prime mover 18 can be securely mounted to the mounting collar 78 using any other suitable connecting means, method, device or mechanism.

As described above, the surface area of the prime mover mounting face 86 is sized and shaped to distribute the weight/mass of the prime mover 18 and load(s) exerted by and on the prime mover 18 across that surface area such that the prime mover 18 can be cantilevered from mounting collar 78, absent any additional structure for mounting the prime mover 18 to the vehicle 14. Particularly, the prime mover mounting face 86 is sized and shaped such that when the prime mover 18 is mounted to the mounting collar 78 substantially the entire surface area of the prime mover mounting face 86 is in contact with at least substantially the entire surface area of the collar mounting face 94 (and/or vice-versa). Therefore, sufficient contact surface area is provided between the mounting faces 86 and 94 to distribute the weight/mass of the cantilevered prime mover 18 and the load(s) exerted by and on the cantilevered prime mover 18 across the contact surface area. And therefore, sufficient support is provided for the cantilevered prime mover 18 and to bear the load(s) exerted by and on the prime mover 18 when the prime mover 18 and/or vehicle 14 are in operation, and when the prime mover 18 and/or vehicle 14 are not operating or are stationary or at rest. Said another way, the contact surface area between the mounting faces 86 and 94 is sized and shaped to provide the sufficient weight distribution of the prime mover within the respective design constraints. Additionally, the geometry of contact surface area between the mounting faces 86 and 94 provides an effective clamping load with significantly high margin of safety for the respective material used on the construction of the body of the prime mover 18 and the transaxle 22. For example, in various embodiments, the contact surface area between the mounting faces 86 and 94 can be between approximately 5000.0 mm$^2$ and 6500.0 mm$^2$ (e.g., approx. 5700.00 mm$^2$).

Referring now to FIGS. 3, 4, 5, 6 and 9, in various embodiments, to assist in supporting the prime mover 18 and bearing the load(s) generated by and exerted on the prime mover 18, the mounting collar 82 and/or the prime mover 18 can comprise at least one alignment pin 90 extending from at least one of the mounting collar prime mover mounting face 86 and a mounting face 94 of the prime mover 18. The alignment pin(s) 90 is/are located along the mounting collar prime mover mounting face 86 and/or prime mover mounting face 94 and are structured to mate with a corresponding alignment pin receptacle 92 disposed in the respective corresponding mounting collar prime mover mounting face 86 and/or prime mover mounting face 94. In addition to helping support the prime mover 18 and bearing the load(s) generated by and exerted on the prime mover 18 absent any additional structure for mounting the prime mover 18 to the vehicle 14, the alignment pin(s) 90 is/are structured and operable to align the mounting collar prime mover mounting face 86 and prime mover mounting face 94 with each other. More specifically, the alignment pin(s) 90 align the mounting collar and prime mover mounting faces 86 and 94 such that substantially the entire surface area of the mounting collar prime mover mounting face 86 is in contact with at least substantially the entire surface area of the prime mover mount face 94 (and/or vice-versa). Therefore, sufficient contact surface area is provided between the mounting faces 86 and 94 to distribute the weight/mass of the cantilevered prime mover 18 and the load(s) exerted by and on the prime mover 18 across the contact surface area. And therefore, sufficient support is provided for the cantilevered prime mover 18 and for bearing the load(s) exerted by and on the prime mover 18 when the prime mover 18 and/or vehicle 14 are in operation, and when the prime mover 18 and/or vehicle 14 are not operating or are stationary or at rest.

Furthermore, in various embodiments, the alignment pin(s) 90 is/are structured and operable to coaxially align an output shaft 98 of the prime mover 18 with an input shaft 102 of the transaxle 22 such that the prime mover output shaft 98 can be coupled directly to the transaxle input shaft 102. More specifically the alignment pin(s) 90 is/are structured and operable to align the prime mover output shaft 98 with the transaxle input shaft 102 such that a longitudinal axis of the prime mover output shaft 98 will coaxially align with a longitudinal axis of the transaxle input shaft 102, thereby allowing the prime mover output shaft 98 and the transaxle input shaft 102 to be directly connected to each other. For example, in various instances, one of the prime mover output shaft 98 or the transaxle input shaft 102 can be a hollow shaft with splined interior (exemplarily shown in the figures to be the prime mover output shaft 98) and the respective other prime mover output shaft 98 or the transaxle input shaft 102 can be a solid shaft with a splined exterior (exemplarily shown in the figures to be the transaxle input shaft 102), such that prime mover output shaft 98 can directly connect and mate with the transaxle input shaft 102 in a splined interconnection.

In various embodiments, the mounting collar 78 can further comprises a plurality of gussets 110 formed along an interior surface of the sidewall 82. The gussets 110 are structured and operable to add strength to the sidewall 82 such that the mounting collar 78 will support the prime mover 18 and bear the load(s) exerted by and on the prime mover 18 when the prime mover 18 and/or vehicle 14 are in operation, and when the prime mover 18 and/or vehicle 14 are not operating or are stationary or at rest. In various instances, the gussets 110 can be triangular structures that are connected or integrally formed between the interior surface of the sidewall 82 and the interior surface of a base 114 of the mounting collar 78. The gussets 110 provide support to the sidewall 82 and help reduce or prevent flexure of sidewall 78 caused by the weight/mass of the cantilevered prime mover 18 and/or the load(s) exerted by and on the prime mover 18.

Figure 14:
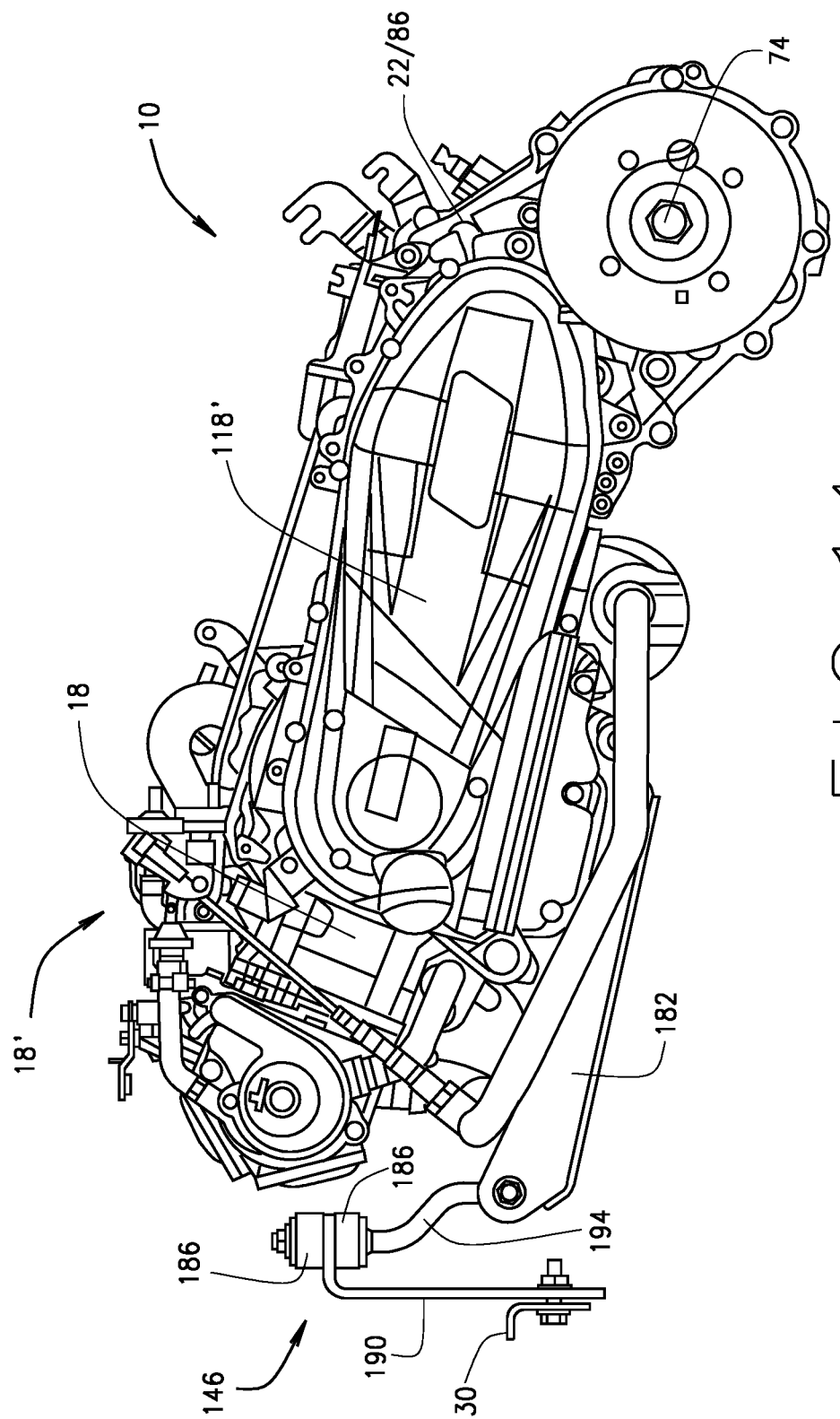
FIG. 14 is side view of the unitized powertrain having a front portion thereof mounted to structure of the vehicle utilizing at least one isolator mount, in accordance with various embodiments of the present disclosure.
Figure 15:
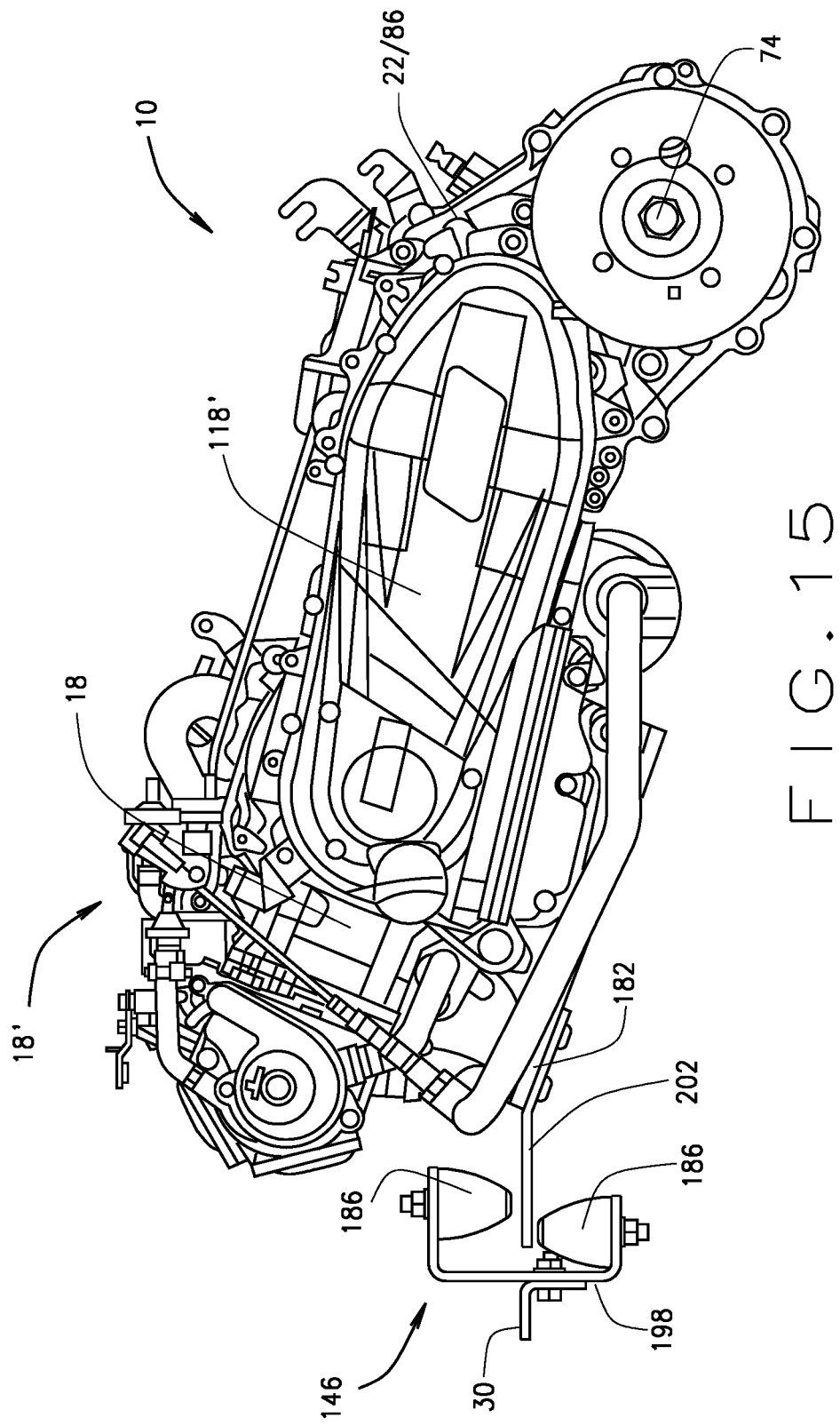
FIG. 15 is a side view of the unitized powertrain having a front portion thereof mounted to the structure of the vehicle utilizing at least one isolator mount, in accordance with various other embodiments of the present disclosure.

Although the mounting collar 78 has been described above with regard to embodiments wherein the prime mover 18 is cantilevered from the transaxle 22 absent any additional structure for mounting the prime mover 18 to the vehicle 14, the description above of the mounting collar is equally applicable for embodiments wherein the prime mover 18 is connected to the a portion of the vehicle 14 and supported by one or more isolator mounts such as the isolator mounts 146 exemplarily illustrated in and described with regard to FIGS. 14 and 15.

In various embodiments, the prime mover 18 is structured and designed to locate the center of gravity of the prime mover 18 a desired distance from the transaxle 22 and the ground in order to aid the mounting collar 78 in supporting the load(s) generated by and acting on the prime mover 18, in various instances such that the prime mover 18 can be cantilevered from the transaxle 22. More particularly, the prime mover 18 is structured and designed to have a length, height, width and weight/mass designed to locate the center of gravity of the prime mover 18 a desired distance from the transaxle 22 and the ground that allows the mounting collar 78 to support the load(s) generated by and acting on the prime mover 18, in various instances such that the prime mover 18 can be cantilevered from the transaxle 22. In various embodiments, the overall size of the prime mover 18 is designed to be smaller than known prime movers (e.g., internal combustion engines) known to be used in various lightweight vehicles (e.g., golf cars).

For example, in various instances, the prime mover 18 is designed to be between 15%-30% (e.g., 22%) smaller than known prime movers known to be used in various lightweight vehicles. The reduction in the length of the prime mover 18 locates the center of gravity (CG) of the prime mover 18 closer to the longitudinal center axis P of the axle shaft 74, thereby reducing the overhang mass, and hence, the rotational moment of the powertrain 10. In various instances where the powertrain 10 includes a transmission (as described below) the reduction in size of the prime mover 18 additionally requires that the design of the transmission 118 and/or 118' be reduced with regard to known transmissions, thereby further reducing the mass of the powertrain 10. For example, as exemplarily shown in FIG. 8, in various embodiments, the CG of the powertrain 10 can be located, as measured from the longitudinal center axis P of the axle shaft 74, between approximately 45.0 mm and 60.0 mm (e.g., approx. 51.0 mm) in the Z direction vertically above the axis P, between approximately 165.0 mm and 180.0 mm (e.g., approx. 171.0 mm) in the X direction forward of/in front of the axle axis P, and between approximately 45.0 mm and 60.0 mm (e.g., approx. 53.0 mm) in the Y direction along the axis P toward the driver's side end of the axle shaft 74 from the vehicle center toward the driver side.

As used herein, the word "forward" and the phrase "forward of" are used to describe the direction from a named component or structure toward the front of the vehicle 14. For example, the statement that the steering wheel 54 is located "forward of" the longitudinal center means the steering wheel 54 is located within an area that extends from the longitudinal center of the vehicle 14 to the front of the vehicle 14. Similarly, as used herein, the word "rearward" and the phrase "rearward of" are used to describe the direction from a named component or structure toward the rear of the vehicle 14. For example, the statement that a component of the vehicle 14 or powertrain 10 is located "rearward of" the longitudinal center means the component is located within an area that extends from the longitudinal center of the vehicle 14 to the rear of the vehicle 14.

Figure 7:
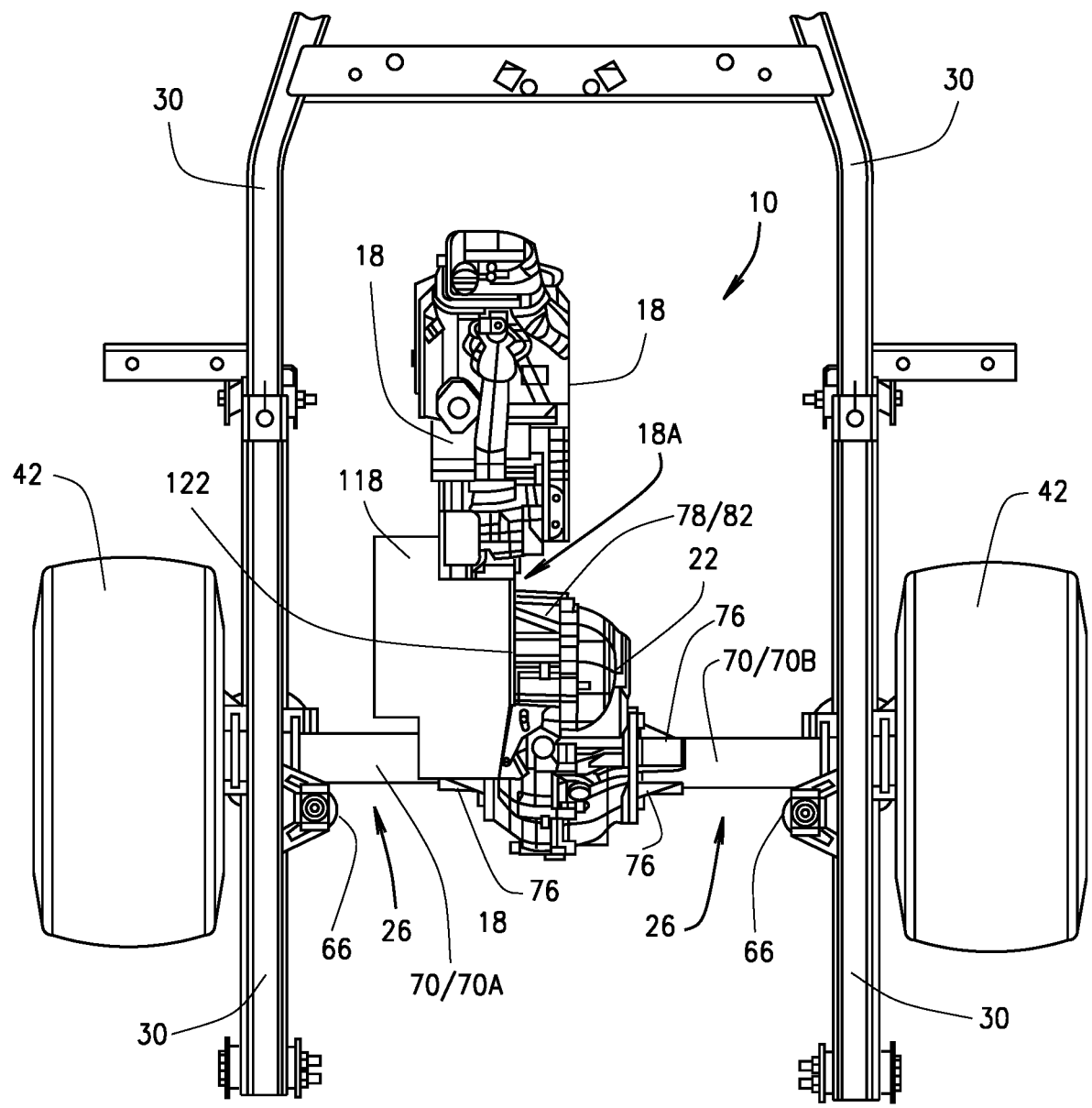
FIG. 7 is a partially exploded view of the 'floating' powertrain mounted to the axle assembly including a transmission, in accordance with various embodiments of the present disclosure.

Referring now to FIG. 7, in various embodiments, the unitized powertrain 10 can further comprise a transmission 118 that is fixedly and operationally connected to the prime mover 18. In various 'floating' powertrain embodiments, the powertrain 10 can comprise the transmission 118 that is fixedly and operationally connected to the prime mover 18 and to the transaxle mounting collar 78 absent any additional structure for mounting the transmission 118 to the vehicle 14. While in other embodiments, the powertrain 10 can comprise the transmission 118 that is fixedly and operationally connected to the prime mover 18 and to the transaxle mounting collar 78 having at least the prime mover mounted to a portion of the vehicle 14 (e.g., the chassis 30) via one or more isolator mount, such as the isolator mounts 146 shown in and described with regard to FIGS. 14 and 15). As illustrated in FIG. 7, the transmission 118 is connected to the prime mover 18 and receives power (e.g., torque) output by the prime mover 18. The transmission 118 in turn transfers the power delivered from the prime mover 18 to the transaxle 22, which in turn deliver the power as motive force to the axle assembly 26 and wheel (e.g., rear wheels 42) In various instances, the transmission 118 can comprise a plurality of gears (not show) that are interoperatively engaged or connected to controllably provide various gear ratios that adjust (e.g., increase or decrease) the power delivered to the transaxle 22. In various other instances, the transmission 118 can comprise a continuously-variable-transmission (CVT) that delivers the power to transaxle 22 through a continuous range of gear ratios via a system of pulleys and belts.

In such embodiments, the transmission 118 comprises a mounting face 122 that is similar to the prime mover mounting face 94 described above, for mounting the transmission 118 to transaxle mounting collar 78. More particularly, the transmission 118 mounts to the mounting collar 78 in the same manner as described above with regard to the prime mover 18. Specifically, the transmission mounting face 122 contacts the mounting collar mounting face 86 when the transmission 118 is mounted to the mounting collar 78. The surface area of the mounting collar mounting face 86 is sized and shaped to distribute the weight/mass of the prime mover 18 and the transmission 118, and the load(s) exerted by and on the prime mover 18 and transmission 118 across that surface area, in various instances such that the prime mover 18 and transmission 118 can be cantilevered from mounting collar 78 absent any additional structure for mounting the prime mover 18 and/or transmission 118 to the vehicle 14. Particularly, the mounting face 86 is sized and shaped such that when the transmission 118 is mounted to the mounting collar 78 substantially the entire surface area of the mounting collar mounting face 86 is in contact with at least substantially the entire surface area of the transmission mount face 122 (and/or vice-versa).

Therefore, sufficient contact surface area is provided between the mounting faces 86 and 122 to distribute the weight/mass of the prime mover 18 and transmission 118, e.g., the cantilevered prime mover 18 and transmission 118, and the load(s) exerted by and on the prime mover 18 and transmission 118 across the contact surface area. And therefore, sufficient support is provided for the prime mover 18 and transmission 118, e.g., the cantilevered prime mover 18 and transmission 118, to bear the load(s) exerted by and on the prime mover 18 and transmission 118 when the prime mover 18 and/or transmission 118 and/or vehicle 14 are in operation, and when the prime mover 18 and/or transmission 118 and/or vehicle 14 are not operating or are stationary or at rest. Therefore, the size and shape of the surface area of the mounting face 86 (e.g., circumferential length and width of the mounting face 86) is dependent on the size and weight/mass of the prime mover 18 and transmission 118 and the load(s) generated by and acting on the prime mover 18 and transmission 118.

Furthermore, in such embodiments, the transmission 18 can comprise at least one alignment pin 90 (not shown) extending from the transmission mounting face 122. Similar to the description above with regard to FIGS. 4, 5 and 6, the alignment pin(s) 90 is/are located along the mounting collar mounting face 86 and/or transmission mounting face 122 and are structured to mate with a corresponding alignment pin receptacle 92 (not shown) disposed in the respective corresponding mounting collar mounting face 86 and/or transmission mounting face 122. In addition to helping support the prime mover 18 and transmission 118 and bearing the load(s) generated by and exerted on the prime mover 18 and transmission 118, in various instances absent any additional structure for mounting the prime mover 18 and transmission 118 to the vehicle 14, the alignment pin(s) 90 is/are structured and operable to align the mounting collar mounting face 86 and transmission mounting face 122 with each other. More specifically, the alignment pin(s) 90 align the mounting collar and transmission mounting faces 86 and 122 such that substantially the entire surface area of the mounting collar mounting face 86 is in contact with at least substantially the entire surface area of the transmission mount face 122 (and/or vice-versa). Therefore, sufficient contact surface area is provided between the mounting faces 86 and 122 to distribute the weight/mass of the prime mover 18 and transmission 122, e.g., the cantilevered prime mover 18 and transmission 122, and the load(s) exerted by and on the prime mover 18 and transmission 122 across the contact surface area. And therefore, sufficient support is provided for the prime mover 18 and transmission 122, e.g., the cantilevered prime mover 18 and transmission 122, and to bear the load(s) exerted by and on the prime mover 18 and transmission 118 when the prime mover 18 and/or transmission 118 and/or vehicle 14 are in operation, and when the prime mover 18 and/or transmission 118 and/or vehicle 14 are not operating or are stationary or at rest.

Additionally, in various embodiments, the alignment pin(s) 90 is/are structured and operable to coaxially align an output shaft (not shown) of the transmission 118 with an input shaft 102 of the transaxle 22 such that the transmission output shaft can be coupled directly to the transaxle input shaft 102. More specifically the alignment pin(s) 90 is/are structured and operable to align the transmission output shaft with the transaxle input shaft 102 such that a longitudinal axis of the transmission output shaft will coaxially align with a longitudinal axis of the transaxle input shaft 102, thereby allowing the transmission output shaft 98 and the transaxle input shaft 102 to be directly connected to each other. For example, in various instances, one of the transmission output shaft or the transaxle input shaft 102 can be a hollow shaft with splined interior and the respective other transmission output shaft or the transaxle input shaft 102 can be a solid shaft with a splined exterior, such that transmission output shaft can directly connect and mate with the transaxle input shaft 102 in a splined interconnection.

In various embodiments, the prime mover 18 and transmission 118 are structured and designed to locate the center of gravity of the prime mover 18 and transmission 118 a desired distance from the transaxle 22 and the ground in order to aid the mounting collar 78 in supporting the load(s) generated by and acting on the prime mover 18 and transmission 118, in various instances such that the prime mover 18 and transmission 118 can be cantilevered from the transaxle 22. More particularly, the prime mover 18 and transmission 118 are structured and designed to have a combined length, height, width and weight/mass designed to locate the center of gravity of the prime mover 18 and transmission 118 a desired distance from the transaxle 22 and the ground that allows the mounting collar 78 to support the load(s) generated by and acting on the prime mover 18 and transmission 118, in various instances such that the prime mover 18 and transmission 118 can be cantilevered from the transaxle 22. As described above, in various embodiments, the overall size of the prime mover 18 is designed to be smaller than known prime movers (e.g., internal combustion engines) known to be used in various lightweight vehicles (e.g., golf cars).

For example, in various instances, the prime mover 18 is designed to be between 15%-30% (e.g., 22%) smaller than known prime movers known to be used in various lightweight vehicles. The reduction in the length of the prime mover 18 locates the center of gravity (CG) of the prime mover 18 closer to the longitudinal center axis P of the axle shaft 74, thereby reducing the overhang mass, and hence, the rotational moment of the powertrain 10. In various instances where the powertrain 10 includes a transmission (as described with regard to FIGS. 7 and/or 8) the reduction in size of the prime mover 18 additionally requires that the design of the transmission 118 and/or 118' be reduced with regard to known transmissions, thereby further reducing the mass of the powertrain 10. For example, as exemplarily shown in FIG. 8, in various embodiments, the CG of the powertrain 10 can be located, as measured from the longitudinal center axis P of the axle shaft 74, between approximately 45.0 mm and 60.0 mm (e.g., approx. 51.0 mm) in the Z direction vertically above the axis P, between approximately 165.0 mm and 180.0 mm (e.g., approx. 171.0 mm) in the X direction forward of/in front of the axle P, and between approximately 45.0 mm and 60.0 mm (e.g., approx. 53.0 mm) in the Y direction along the axis P toward the driver's side end of the axle shaft 74 from the vehicle center toward the driver side.

Figure 8:
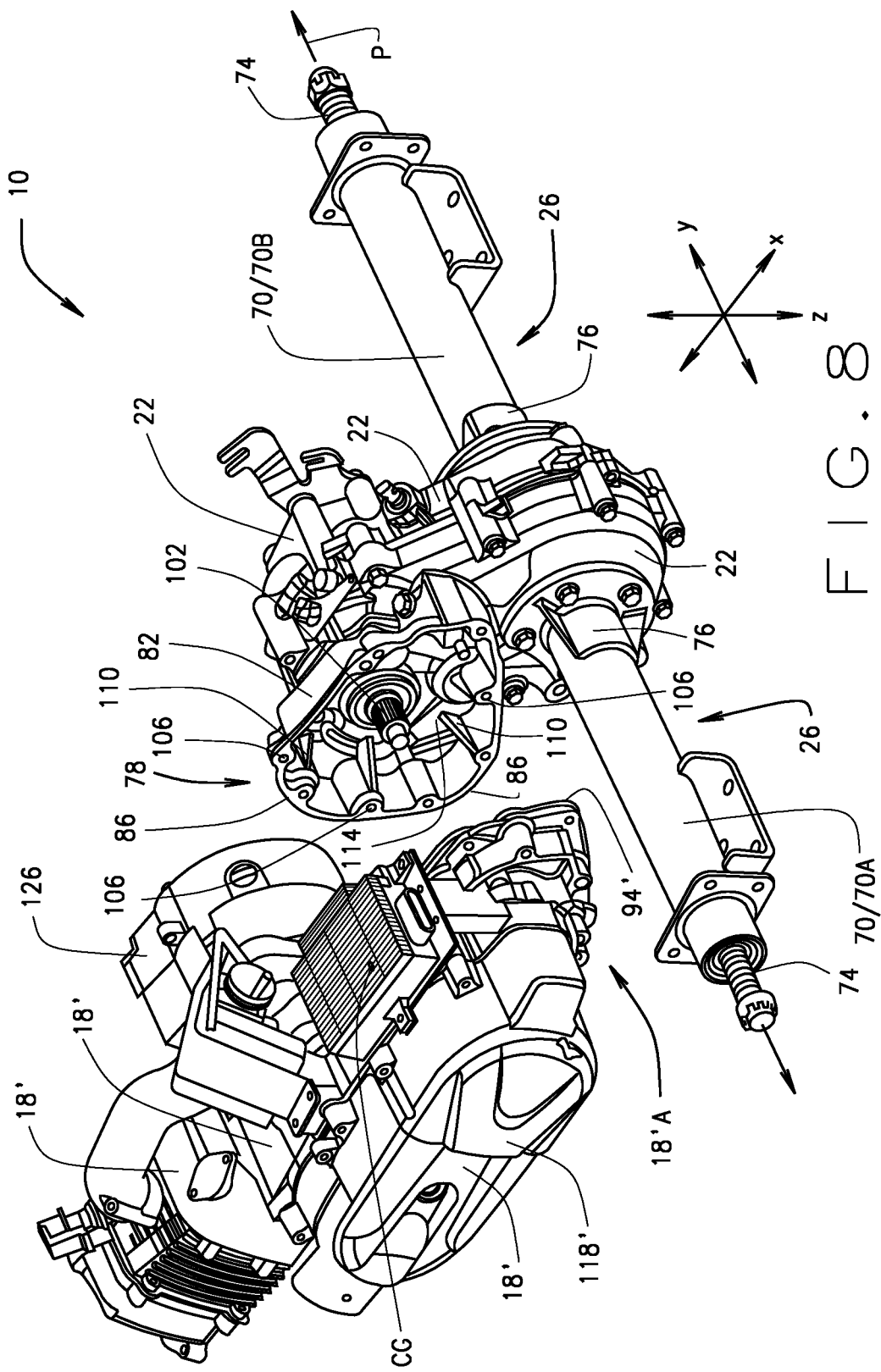
FIG. 8 is a partially exploded view of the unitized powertrain mounted to the axle assembly comprising an integrated prime mover-transmission comprising the prime mover integrated with a transmission in accordance with various embodiments of the present disclosure.
Figure 9:
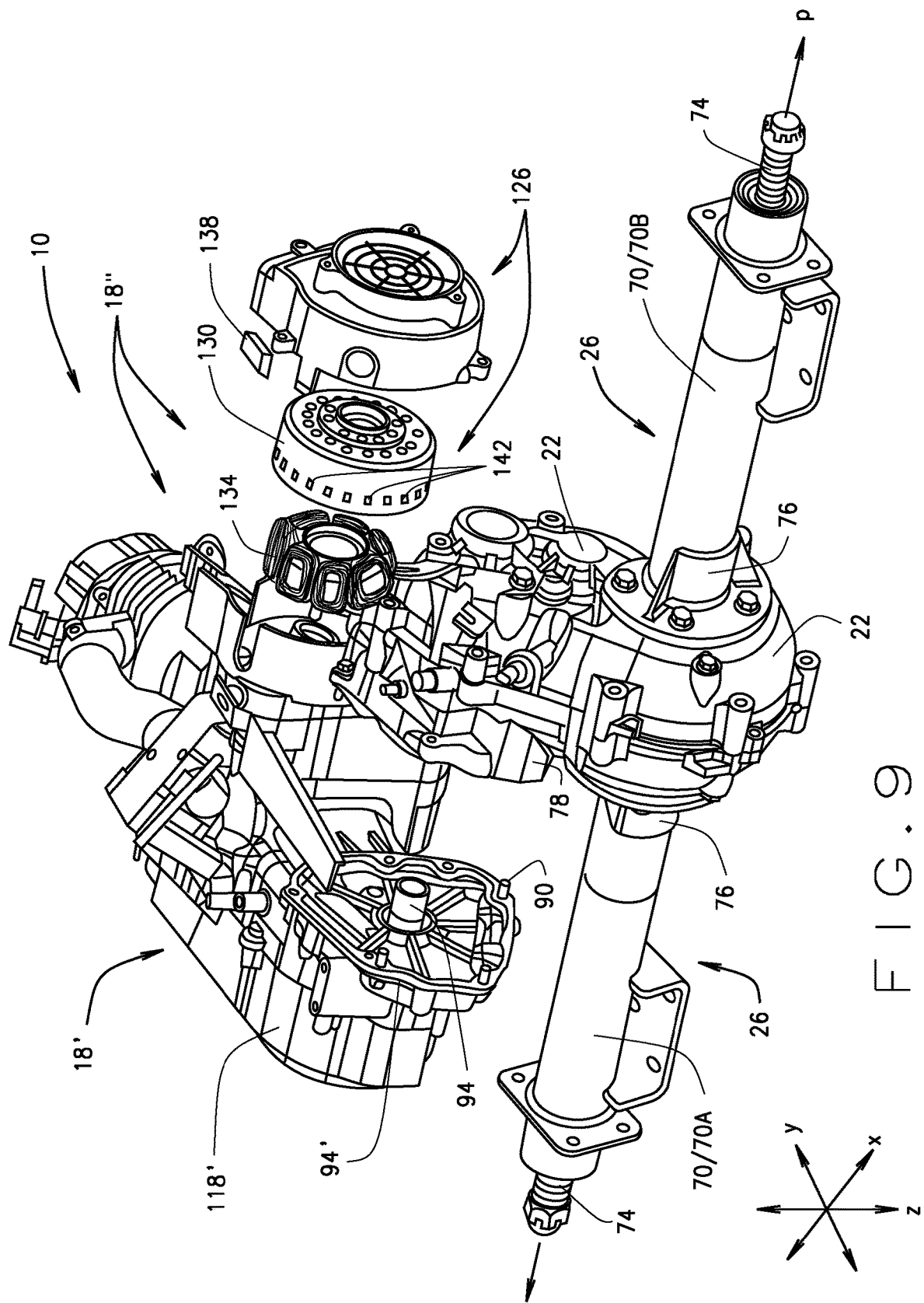
FIG. 9 is a partially exploded view of the unitized powertrain mounted to the axle assembly comprising an integrated prime mover-starter motor comprising the prime mover integrated with a starter motor, in accordance with various embodiments of the present disclosure.
Figure 10:
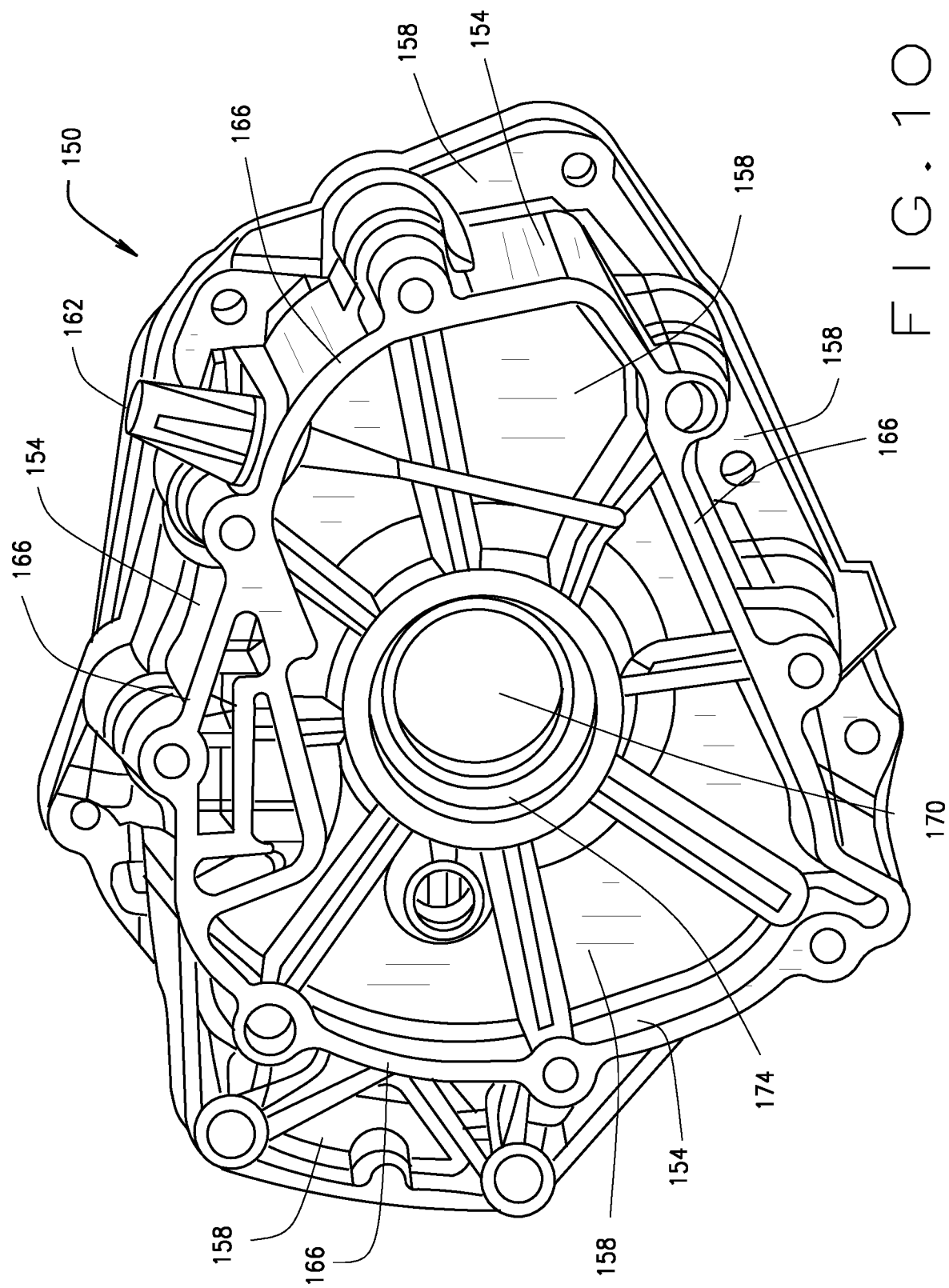
FIG. 10 is an isometric view of a mating interface of the unitized powertrain, in accordance with various embodiments of the present disclosure.

Referring now to FIGS. 8 and 9 in various embodiments, the unitized powertrain 10, in various instances the 'floating' powertrain 10, can comprise an integrated prime mover-transmission unit 18' that comprises a prime mover 18 integrated and integrally fabricated with a transmission 118' to provide a single unit or component of the powertrain 10. The prime mover-transmission unit 18' is fixedly connected to the transaxle mounting collar 78, in various instances absent any additional structure for mounting the prime mover-transmission unit 18' to the vehicle 14. The prime mover-transmission unit 18' is structured and operable to generate power (e.g., torque) via the prime mover portion of the prime mover-transmission unit 18', and to controllably adjust (e.g., increases and/or decreases) and deliver the power generated to the transaxle 22 via the transmission portion of the prime mover-transmission unit 18'. The transaxle 22 in turn delivers the power as motive force to the axle assembly 26 and wheel (e.g., rear wheels 42) In various instances, the transmission portion 118' of the prime mover-transmission unit 18' can comprise a plurality of gears (not show) that are interoperatively engaged or connected to controllably provide various gear ratios that adjust (e.g., increase or decrease) the power delivered to the transaxle 22. In various other instances, the transmission portion 118' of the prime mover-transmission unit 18' can comprise a continuously-variable-transmission (CVT) that delivers the power to transaxle 22 through a continuous range of gear ratios via a system of pulleys and belts.

The prime mover-transmission unit 18' comprises a mounting face 94' at a distal end 18'A that is similar to the prime mover mounting face 94 described above, for mounting the prime mover-transmission unit 18' to transaxle mounting collar 78. More particularly, the prime mover-transmission unit 18' mounts to the mounting collar 78 in the same manner as described above with regard to the prime mover 18. Specifically, the prime mover-transmission unit 18' mounting face 94' contacts the mounting collar mounting face 86 when the prime mover-transmission unit 18' is mounted to the mounting collar 78. The surface area of the mounting collar mounting face 86 is sized and shaped to distribute the weight/mass of the prime mover-transmission unit 18', and the load(s) exerted by and on the prime mover-transmission unit 18' across that surface area, in various instances such that the prime mover-transmission unit 18' can be cantilevered from mounting collar 78, absent any additional structure for mounting the prime mover-transmission unit 18' to the vehicle 14. Particularly, the mounting face 86 is sized and shaped such that when the prime mover-transmission unit 18' is mounted to the mounting collar 78 substantially the entire surface area of the mounting collar mounting face 86 is in contact with at least substantially the entire surface area of the prime mover-transmission unit mount face 94' (and/or vice-versa).

Therefore, sufficient contact surface area is provided between the mounting faces 86 and 94' to distribute the weight/mass of the prime mover-transmission unit 18', in various instances the cantilevered prime mover-transmission unit 18', and the load(s) exerted by and on the prime mover-transmission unit 18' across the contact surface area. And therefore, sufficient support is provided for the prime mover-transmission unit 18', e.g., the cantilevered prime mover-transmission unit 18', and to bear the load(s) exerted by and on the prime mover-transmission unit 18' when the prime mover-transmission unit 18' and/or vehicle 14 are in operation, and when the prime mover-transmission unit 18' and/or vehicle 14 are not operating or are stationary or at rest. Therefore, the size and shape of the surface area of the mounting face 86 (e.g., circumferential length and width of the mounting face 86) is dependent on the size and weight/mass of the and bear the load(s) exerted by and on the prime and the load(s) generated by and acting on the and bear the load(s) exerted by and on the prime. As described above, in various embodiments the contact surface area between the mounting faces 86 and 94 is sized and shaped to provide the sufficient weight distribution of the prime mover within the respective design constraints. Additionally, the geometry of contact surface area between the mounting faces 86 and 94 provides an effective clamping load with significantly high margin of safety for the respective material used on the construction of the body of the prime mover 18 and the transaxle 22. For example, in various embodiments, the contact surface area between the mounting faces 86 and 94 can be between approximately 5000.0 mm² and 6500.0 mm² (e.g., approx. 5700.00 mm²).

Furthermore, in such embodiments, the prime mover-transmission unit 18' can comprise at least one alignment pin 90 (not shown) extending from the prime mover-transmission unit mounting face 94'. Similar to the description above with regard to FIGS. 4, 5 and 6, the alignment pin(s) 90 is/are located along the mounting collar mounting face 86 and/or prime mover-transmission unit mounting face 94' and are structured to mate with a corresponding alignment pin receptacle 92 (not shown) disposed in the respective corresponding mounting collar mounting face 86 and/or prime mover-transmission unit mounting face 94'. In addition to helping support the prime mover-transmission unit 18' and bearing the load(s) generated by and exerted on the prime mover-transmission unit 18', in various instances absent any additional structure for mounting the prime mover-transmission unit 18' to the vehicle 14, the alignment pin(s) 90 is/are structured and operable to align the mounting collar mounting face 86 and prime mover-transmission unit mounting face 94' with each other. More specifically, the alignment pin(s) 90 align the mounting collar and prime mover-transmission unit mounting faces 86 and 94' such that substantially the entire surface area of the mounting collar mounting face 86 is in contact with at least substantially the entire surface area of the prime mover-transmission unit mount face 94' (and/or vice-versa). Therefore, sufficient contact surface area is provided between the mounting faces 86 and 94' to distribute the weight/mass of the cantilevered prime mover-transmission unit 18', and the load(s) exerted by and on the prime mover-transmission unit 18' across the contact surface area. And therefore sufficient support is provided for the cantilevered prime mover-transmission unit 18' and to bear the load(s) exerted by and on the prime mover-transmission unit 18' when the prime mover-transmission unit 18' and/or vehicle 14 are in operation, and when the prime mover-transmission unit 18' and/or vehicle 14 are not operating or are stationary or at rest.

Additionally, in various embodiments, the alignment pin(s) 90 is/are structured and operable to align an output shaft 98' of the prime mover-transmission unit 18' with an input shaft 102 of the transaxle 22 such that the prime mover-transmission unit output shaft 98' can be coupled directly to the transaxle input shaft 102. More specifically the alignment pin(s) 90 is/are structured and operable to align the prime mover-transmission unit output shaft 98' with the transaxle input shaft 102 such that a longitudinal axis of the prime mover-transmission unit output shaft 98' will coaxially align with a longitudinal axis of the transaxle input shaft 102, thereby allowing the prime mover-transmission unit output shaft 98' and the transaxle input shaft 102 to be directly connected to each other. For example, in various instances, one of the prime mover-transmission unit output shaft or the transaxle input shaft 102 can be a hollow shaft with splined interior and the respective other prime mover-transmission unit output shaft or the transaxle input shaft 102 can be a solid shaft with a splined exterior, such that prime mover-transmission unit output shaft can directly connect and mate with the transaxle input shaft 102 in a splined interconnection.

In various embodiments, the prime mover-transmission unit 18' is structured and designed to locate the center of gravity of the prime mover-transmission unit 18' a desired distance from the transaxle 22 and the ground in order to aid the mounting collar 78 in supporting the load(s) generated by and acting on the prime mover-transmission unit 18', in various instances such that the prime mover-transmission unit 18' can be cantilevered from the transaxle 22. More particularly, the prime mover-transmission unit 18' is structured and designed to have a length, height, width and weight/mass designed to locate the center of gravity of the prime mover-transmission unit 18' a desired distance from the transaxle 22 and the ground that allows the mounting collar 78 to support the load(s) generated by and acting on the prime mover-transmission unit 18', in various instances such that the prime mover-transmission unit 18' can be cantilevered from the transaxle 22. As described above, in various embodiments, the overall size of the prime mover 18 is designed to be smaller than known prime movers (e.g., internal combustion engines) known to be used in various lightweight vehicles (e.g., golf cars).

For example, in various instances, the prime mover 18 is designed to be between 15%-30% (e.g., 22%) smaller than known prime movers known to be used in various lightweight vehicles. The reduction in the length of the prime mover 18 locates the center of gravity (CG) of the prime mover 18 closer to the longitudinal center axis P of the axle shaft 74, thereby reducing the overhang mass, and hence, the rotational moment of the powertrain 10. In various instances where the powertrain 10 includes a transmission the reduction in size of the prime mover 18 additionally requires that the design of the transmission 118 and/or 118' be reduced with regard to known transmissions, thereby further reducing the mass of the powertrain 10. For example, as exemplarily shown in FIG. 8, in various embodiments, the CG of the powertrain 10 can be located, as measured from the longitudinal center axis P of the axle shaft 74, between approximately 45.0 mm and 60.0 mm (e.g., approx. 51.0 mm) in the Z direction vertically above the axis P, between approximately 165.0 mm and 180.0 mm (e.g., approx. 171.0 mm) in the X direction forward of/in front of the axle P, and between approximately 45.0 mm and 60.0 mm (e.g., approx. 53.0 mm) in the Y direction along the axis P toward the driver's side end of the axle shaft 74 from the vehicle center toward the driver side.

Referring now to FIGS. 8 and 9, in various embodiments, the unitized powertrain 10 can comprise an integrated prime mover-starter generator 18" that comprises a prime mover 18 integrated and integrally fabricated with a starter generator 126 to provide a single unit or component of the powertrain 10. In various embodiments, the in various embodiments, the unitized powertrain 10 can comprise an integrated prime mover-transmission-starter generator that comprises the prime mover integrated and integrally fabricated with the transmission 118 and the starter generator 126 to provide a single unit or component of the powertrain 10, and remain within the scope of the present disclosure. The starter generator 126 of the integrated prime mover-starter generator 18" generally comprises a rotor 130, a stator or field coil 134, and a Hall Effect position sensor 138, and a fan (not shown). In various instances the rotor 130 is structured as a drum and functions as a fly wheel and includes a plurality of permanent magnets sectors 142 disposed around a sidewall thereof. The center of the drum has a mounting hub to assemble it directly on the crank shaft. The stator 134 comprises a magnetic coil winding and is mounted on or to the engine. The Hall Effect sensor identifies the position of the rotor, which is critical to avoid roll backs by repositioning the crank shaft for quick start. In various instances, in addition to turning the engine to start the engine, the integrated prime mover-starter generator 18" is structured and operable to generate 3-Phase AC electrical power that can be u electrical power usable for various vehicle utility requirements. In various instances, the integrated prime mover-starter generator 18" is structured and operable to be a non-contact compact assembly that integrates the rotor 134 into a crank shaft assembly of the engine while the stator or field coil is mounted to an engine casting and encapsulated by the rotor 134, which acts as fly wheel as well. The integrated prime mover-starter generator 18" is a maintenance free system with no serviceable parts in the assembly thereof and is structured to has few or no mechanical noise sources.

In further embodiments, the powertrain 10 can comprise an integrated prime mover-transmission-starter generator by combining the features, functions, structure and operations of the integrated prime mover-transmission unit 18' with the integrated prime mover-starter generator 18", as described above.

Referring now to FIGS. 10, 11, 12 and 13, in various embodiments, the unitized powertrain 10 can additionally comprise an mating interface 150 that is structured and operable to connect the transaxle 22 having the mounting collar 78 connected thereto or integrally formed therewith to the prime mover 18 or the prime mover—transmission unit 18' in instances where the mounting face 86 of the mounting collar 78 does not mate with the mounting face 94/94' of the prime mover/the prime mover—transmission unit 18/18'. For clarity and simplicity, the mating interface 150 will be described herein with regard to embodiments wherein the unitized powertrain 10 comprises the integrated prime mover-transmission unit 18'. However, is should be understood that the mating interface 150 can be implemented and utilized with the embodiments described above wherein the unitized powertrain 10 comprises the prime mover 18, and/or the integrated prime mover-starter generator 18", and/or an integrated prime mover-transmission-starter generator and remain within the scope of the present disclosure.

The mating interface 150 can be implemented in the unitized powertrain 10 in any instance wherein the mounting face 86 of the mounting collar 78 does not mate with the mounting face 94' of the prime mover—transmission unit 18'. For example, it is envisioned that in various instances it may be desirable to convert an electric golf car (e.g., a golf car wherein the prime mover is an electric motor) to a gas golf car (e.g., a golf car wherein the prime mover is an internal combustion engine (ICE)) by merely replacing the electric motor or electric motor-transmission unit with an ICE or ICE-transmission unit, and utilizing the same the transaxle/mounting collar unit 22/78 (e.g., the transaxle 22 having the mounting collar 78 connected thereto or integrally formed therewith). In such instances, after the electric motor or electric motor-transmission unit is disconnected from the transaxle/mounting collar unit 22/78, the mating interface 150 can be mounted to the mounting face 86 of the mounting collar 78 and the prime mover-transmission unit 18' (e.g., the ICE-transmission unit 18') can be mounted to the mating interface 150 to form a single unitized powertrain 10.

In various embodiments, the mating interface 150 generally comprises a sidewall 154 extending from a mounting plate 158 having a transaxle mounting face 162 to which the transaxle/mounting collar unit 22/78 can be mounted. Particularly, the mating interface transaxle mounting face 162 contacts the transaxle/mounting collar unit mounting face 86 when the transaxle/mounting collar unit 22/78 is mounted to the mating interface 150. The sidewall 154 comprises a prime mover-transmission unit mounting face 166 disposed along a distal edge thereof to which the prime mover-transmission unit 18' can be mounted. Particularly, the mating interface prime mover-transmission unit mounting face 166 contacts the prime mover-transmission unit mounting face 94' when the prime mover-transmission unit 18' is mounted to the mating interface 150.

The mating interface 150 additionally comprises a shaft aperture 170. In various embodiments, the transaxle input shaft 102 or the prime mover-transmission unit output shaft 98' can extend through the shaft aperture 170 to directly engage or connect with the respective transaxle input shaft 102 or the prime mover-transmission unit output shaft 98'. In various embodiments, the mating interface 150 comprises a bearing stand 174 disposed around the shaft aperture 170 that is structured and operable to receive and retain a shaft bearing (not shown) through which a coupling shaft 178 can be disposed. In such instances, the coupling shaft 178 is structured and operable to operatively engage or connect with respective transaxle input shaft 102 with the prime mover-transmission unit output shaft 98'. More specifically, in such instances, the transaxle input shaft 102 can be directly engaged or connected to a first end of the coupling shaft 178 and the prime mover-transmission unit output shaft 98' can be directly engaged or connected to an opposing second end of the coupling shaft 178, such that the transaxle input shaft 102 is operably engaged with or connected to the prime mover-transmission unit output shaft 98', via the coupling shaft 178. Accordingly, power or torque output by the prime mover-transmission unit output shaft 98' is transferred to the transaxle input shaft 102 via the coupling shaft 178.

As described above, when the prime mover-transmission unit 18' (e.g., the ICE-transmission unit 18') and the transaxle/mounting collar unit 22/78 are mounted to the mating interface 150 the powertrain 10 is configured as a single unit powertrain 10, i.e., a unitized powertrain 10.

Furthermore, in various embodiments, the sidewall 154 of the mating interface, and the housings of the transaxle/mounting collar 22/78 and the prime mover-transmission unit 18' are sealed together (e.g., via gaskets not shown) and are absent holes, bores or apertures such that the unitized powertrain 10 is a sealed system wherein the internal components of the powertrain 10, e.g., the components of the prime mover-transmission unit 18', the mating interface 150, and the transaxle/mounting collar unit 22/78, are sealed from exposure to ambient environmental elements such as water, mud, dirt, rocks and other debris. Particularly, by directly connecting or mounting the prime mover-transmission unit 18' and the transaxle/mounting collar unit 22/78 to the mating interface 150, in various instances having one or more gasket or other sealing device disposed within the respective junctions, a rigid, sealed, unitized powertrain 10 is provided. For example, the engine/transmission output shaft 98', the mating interface coupling shaft 178 and the transaxle input shaft 102 are fully enclosed within the housing of the unitized powertrain 10, which includes the prime mover-transmission unit housing, the mating interface sidewall 154, and the transaxle/mounting collar unit housing.

Referring now to FIGS. 14 and 15, as described above, directly connecting or mounting the prime mover-transmission unit 18' and the transaxle/mounting collar unit 22/78 to the mating interface 150, provides a rigid, sealed, unitized powertrain 10. Moreover, the rigid connection between the prime mover-transmission unit 18' and the transaxle/mounting collar unit 22/78 to the mating interface 150 provides sufficient rigidity of the unitized powertrain 10 such that, in various embodiments, the prime mover-transmission unit 18' can be cantilevered from (e.g., suspended from) the transaxle/mounting collar 22/78, as described above, absent any mounting structure other than the transaxle mounting flanges 76 that mount the transaxle 22 to the axle tube(s) 70. Alternatively, in various embodiments, in addition to the mounting of the transaxle 22 to the axle tube(s) 70, the prime mover-transmission unit 18' can be mounted to other vehicle structure (e.g., a portion of the frame or chassis 30) using one or more isolator mount 146. The isolator mount(s) 146 can be any structure, apparatus, component assembly or mechanism that is structured and operable to support at least a portion of the prime mover-transmission unit 18' forward of the transaxle 22, via direct or indirect connection to any suitable vehicle structure, such as the frame or chassis 30. For example, in various embodiments, the prime mover-transmission unit 18' can be mounted to an engine pan 182, which in turn is connected to, engaged with, or interoperable with the isolator mount(s) 146. In various embodiment, the isolator mount(s) 146 can include on or more flexible, compressible and/or resilient isolator bushings 186 that are structured and operable to absorb and dampen vibrations, shaking, and movement of prime mover-transmission unit 18' so that such vibrations, shaking and movement are not transferred to the vehicle frame or chassis 30.

For example, as exemplarily illustrated in FIG. 14, in various instances the isolator mount(s) 146 can comprise an L-shaped chassis mounting bracket 190, a flexible or rigid connecting arm or linkage 194 and a pair of isolator bushings 186. In such instances, first arm of the L-shaped bracket can be mounted to any suitable portion of the vehicle structure, such as the frame or chassis 30, a first end of the connecting arm or linkage 194 can be connected to an engine pan 182 to which the prime mover-transmission unit 18' is mounted, and an opposing second end of the connecting arm or linkage 194 can be connected to a second arm of the L-shaped bracket 190 via the isolator bushings 186. For example, in various instances the second arm of the L-shaped bracket can include an aperture (not shown) through which the second end of the connecting arm or linkage 194 can freely pass. In such instances, the second end of the connecting arm or linkage 194 can be inserted through aperture and connected to the second arm of the L-shaped bracket 190 via the isolator bushings 186, whereby second arm of the L-shaped bracket 190 is disposed between the isolator bushing 186, as illustrated in FIG. 14. Accordingly, the connecting arm or linkage 194 and prime mover-transmission unit 18' would be able to move up and down via the flexure, compressibility or resilience of the isolator bushings 186, move side-to-side and fore-to-aft via the flexibility of the connecting arm or linkage 194, and the isolator bushings 186 would absorb vibrations, shaking, and movement of the prime mover-transmission unit 18' so that transfer of such movement, shaking, and vibrations to the vehicle structure (e.g., the frame or chassis 30) is dampened or absorbed.

In other embodiments, as exemplarily illustrated in FIG. 15, the isolator mount(s) 146 can comprise an C-shaped chassis mounting bracket 198, a flexible or rigid isolator tongue 202 connected to the engine pan 182, and a pair of isolator bushings 186. In such instances, a main arm of the C-shaped bracket 198 can be mounted to any suitable portion of the vehicle structure, such as the frame or chassis 30, one of the isolator bushings 186 can be mounted to an upper arm of the C-shaped bracket 198 and extend downward toward an opposing lower arm of the C-shaped bracket 198, and one of the isolator bushings 186 can be mounted to the lower arm of the C-shaped bracket and extend upward toward the upper arm such that there is a gap or a space between distal ends of the opposing isolator bushings 186 into which a distal end of the isolator tongue 202 can be disposed, as shown in FIG. 15. More specifically, the distal end of the isolator tongue 202 can be disposed within gap between isolator bushings 186 and set or rested on the distal end of the isolator bushing 186 mounted to the lower arm of the C-shaped bracket. Accordingly, the isolator tongue 202 and prime mover-transmission unit 18' would be able to move up and down via the gap or space between the isolator bushings and the flexure, compressibility or resilience of the isolator bushings 186, move side-to-side and fore-to-aft via the gap or space between the isolator bushings, and the isolator bushings 186 would absorb vibrations, shaking and movement of the prime mover-transmission unit 18' so that transfer of such movement, shaking and vibrations to the vehicle structure (e.g., the frame or chassis 30) is dampened or absorbed.

Figure 11:
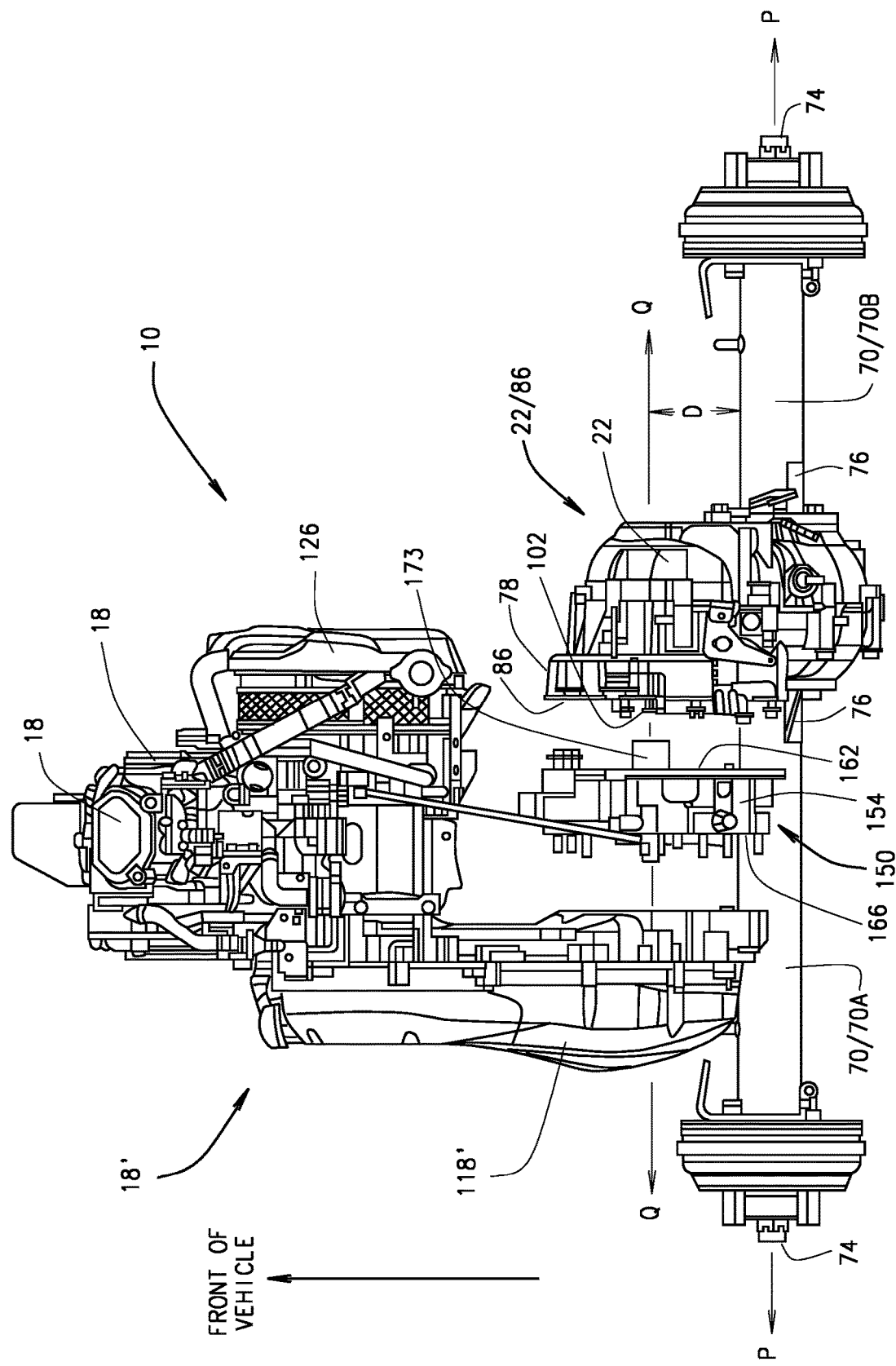
FIG. 11 is an exploded top view of the unitized powertrain including the mating interface, in accordance with various embodiments of the present disclosure.
Figure 12:
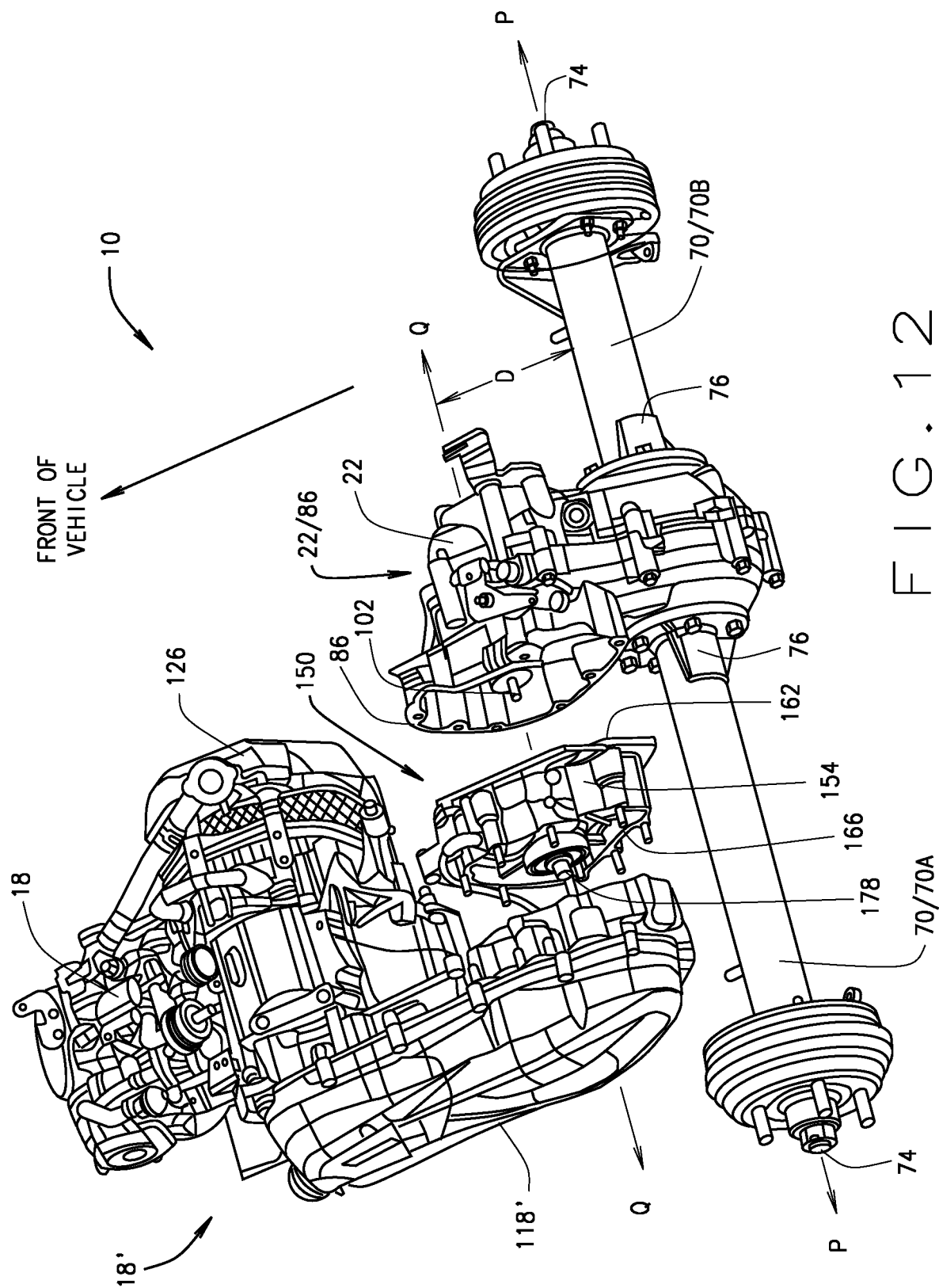
FIG. 12 is an exploded isometric view of the unitized powertrain including the mating interface, in accordance with various embodiments of the present disclosure.
Figure 13:
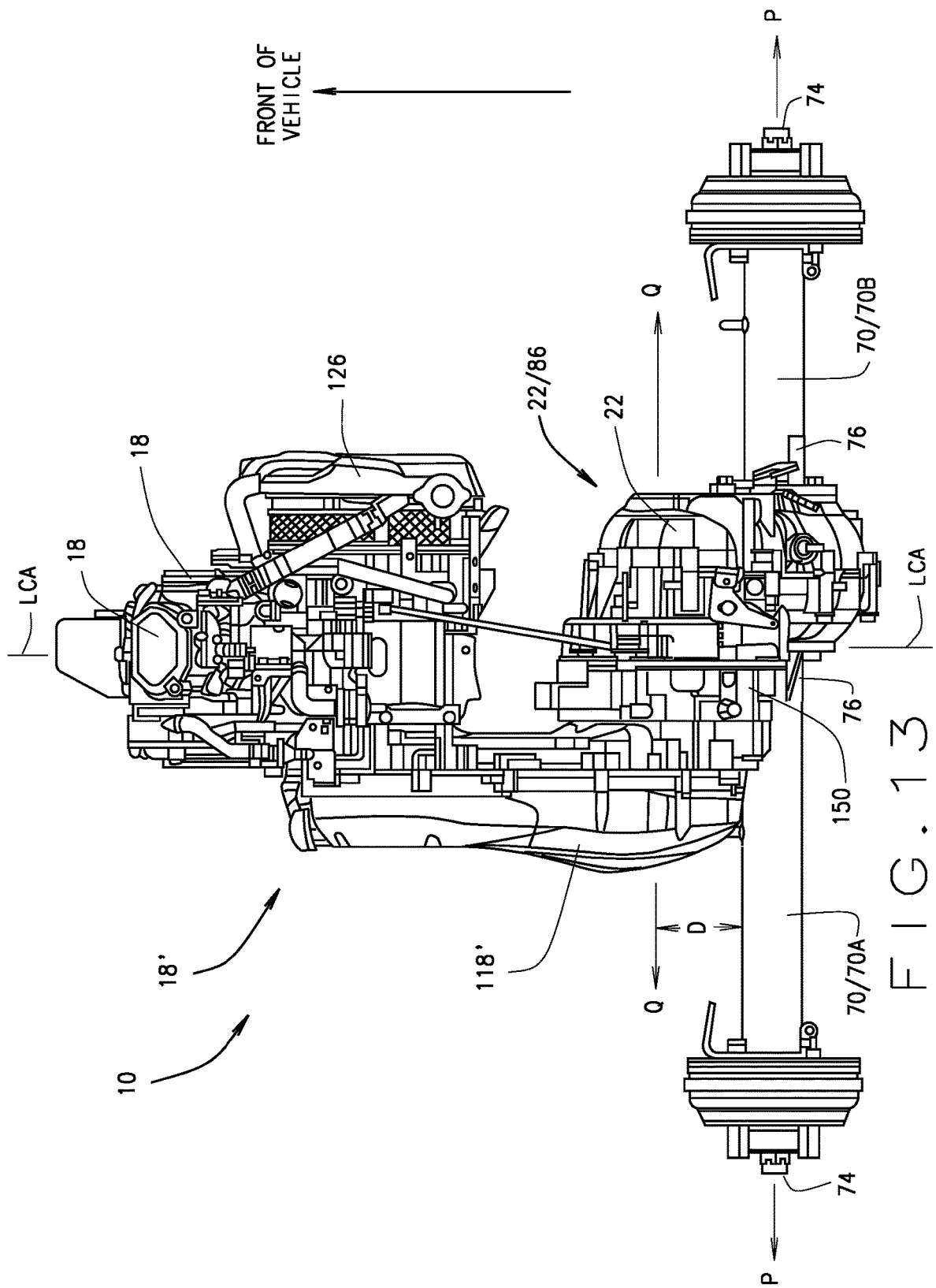
FIG. 13 is a top view of the unitized powertrain including the mating interface, in accordance with various embodiments of the present disclosure.

Referring now to FIGS. 11, 12 and 13, as described above, the prime mover-transmission unit output shaft 98' can be directly connected or indirectly connected (via the coupling shaft 178) to transaxle input shaft 102 such that power or torque output by the prime mover-transmission unit output shaft 98' is transferred to the transaxle input shaft 102 via the coupling shaft 178. Moreover, as illustrated in FIGS. 11, 12 and 13, the prime mover-transmission unit output shaft 98' is connected (directly or indirectly) to transaxle input shaft 102 such that a longitudinal center axis of the prime mover-transmission unit output shaft 98' is collinear with, or parallel with a longitudinal center axis of the transaxle input shaft 102, and both longitudinal center axis are substantially parallel with or collinear with a line Q that is substantially parallel with the longitudinal center axis P of the axle shaft 74. In various embodiments, one or both of the prime mover-transmission unit output shaft 98' and the transaxle input shaft 102 longitudinal center axis can be collinear with the line Q. As illustrated the line Q is substantially parallel with the axle shaft longitudinal center axis P and therefore substantially orthogonal, or non-parallel, to a fore-aft or front-to-rear longitudinal axis of the vehicle 14. Hence, the prime mover-transmission unit output shaft 98' and the transaxle input shaft 102, and their respective longitudinal center axis extend in a side-to-side direction with respect to the vehicle 14 and extend substantially parallel to the wheel axle 74 and its respective longitudinal center axis P.

Furthermore, as illustrated in FIGS. 11, 12 and 13, the transaxle/mounting is oriented and mounted to the axle tube 70 (via the mounting flanges 76) at forward angle, and the prime mover-transmission unit 18' and mating interface 150 are mounted to the transaxle/mounting collar 22/76 such that the longitudinal center axis of the prime mover-transmission unit output shaft 98' and the transaxle input shaft 102 is located, disposed or lies forward of the wheel axle longitudinal center axis P, and in various instances forward of the axle tube 70. For example, in various embodiments wherein the longitudinal center axis of the prime mover-transmission unit output shaft 98' and the longitudinal center axis of the transaxle input shaft 102 are collinear with each other and collinear with the line Q, the transaxle/mounting is oriented and mounted to the axle tube 70 (via the mounting flanges 76) at a forward angle such that the line Q (and hence the longitudinal center axis of the prime mover-transmission unit output shaft 98' and transaxle input shaft 102) are located, disposed or lies forward of the wheel axle longitudinal center axis P, and in various instances forward of the axle tube 70. For example, in various instances of such embodiments the line Q is located, disposed or lies a distance D forward of the axle tube 70, wherein the distance D can be 2 to 18 inches, e.g., 6 to 12 inches.

Figure 16:
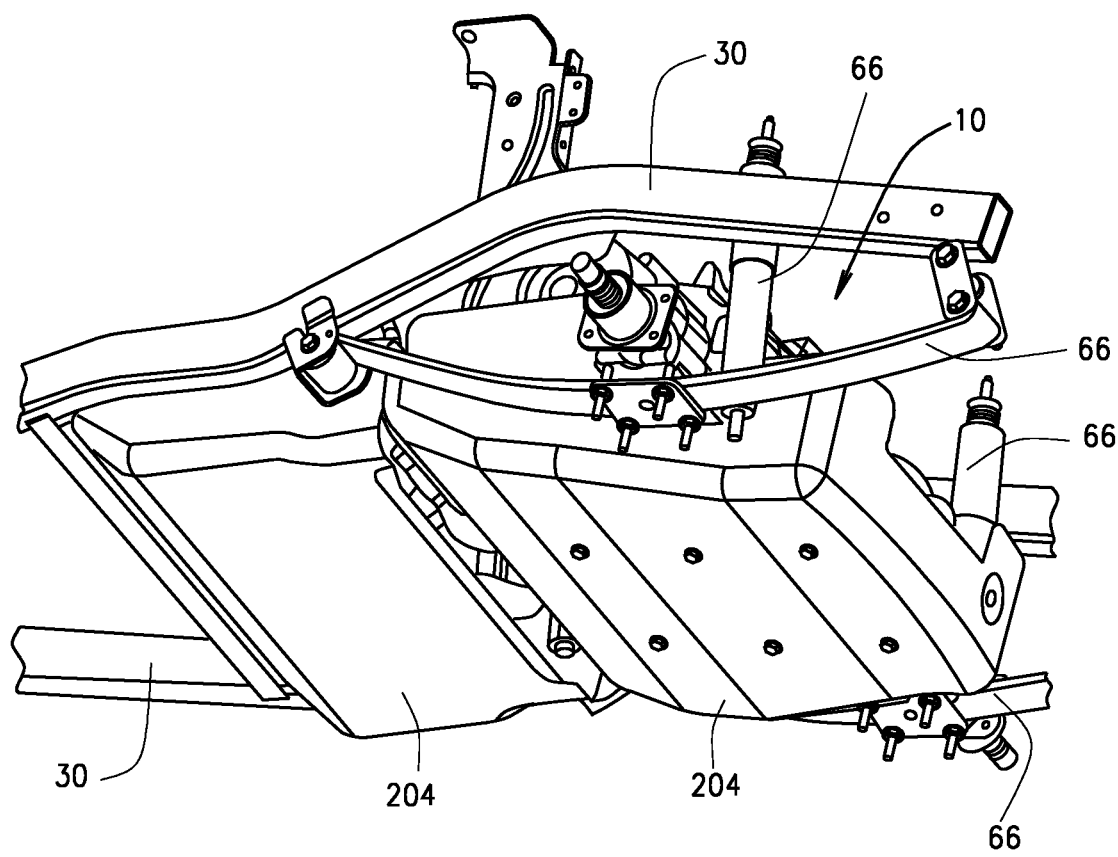
FIG. 16 is an isometric view of at least one noise suppression pan of the vehicle, in accordance with various embodiments of the present disclosure.
Figure 17:
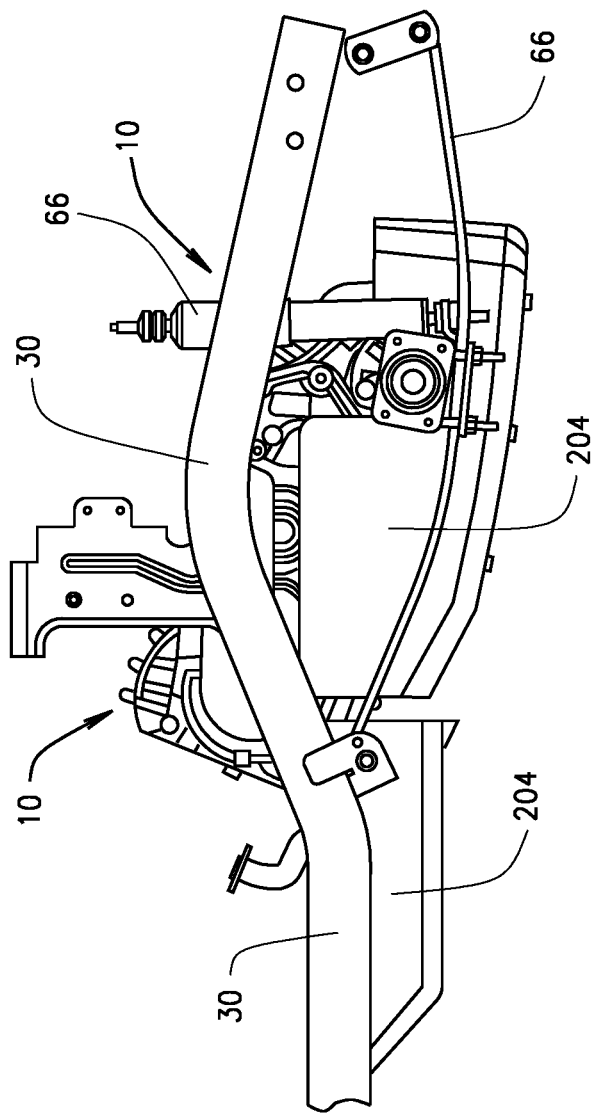
FIG. 17 is side view of the at least one noise suppression pan of the vehicle, in accordance with various embodiments of the present disclosure.

Referring now to FIGS. 16 and 17, in various embodiments, the vehicle 14 can additionally include one or more noise suppression pan or housing 204 that is structured and operable to suppress or prevent noise from the unitized powertrain from traveling to the ambient environment surrounding the vehicle 14 and from being heard by persons in the ambient environment surrounding the vehicle 14 and/or passengers in the passenger compartment. The noise suppression pan(s) 204 can have any shape and be connected to one or more location of the vehicle structure (e.g., the vehicle frame or chassis 30) and/or any portion of the unitized powertrain 10, or structure mounted thereto (e.g., the engine pan 182). For example, in various embodiments, the noise suppression pan(s) 204 can be mounted to a bracket 208 that is mounted to the engine pan 182 such that the noise suppression pan(s) 202 is/are not connected to the vehicle structure (e.g., the frame or chassis structure 30) and is independent therefrom. Accordingly, in such instances, the noise suppression pan(s) can move with the powertrain 10 independent of the vehicle structure (e.g., the frame or chassis structure 30). Additionally, the noise suppression pan(s) 204 can have any desired shape. For example, as illustrated in FIGS. 16, 17 and 18, in various instances the noise suppression pan(s) 204 can comprise a single noise suppression pan 204 and be shaped to have a bottom and four sides such that the noise suppression pan 204 is disposed beneath and around at least a portion of the powertrain 10. Furthermore, the noise suppression pan(s) 204 can have any desired construction designed and suitable to suppress noise generated by the powertrain 10. For example, in various embodiments, the noise suppression pan(s) 204 can comprise a hard and rigid outer shell with a noise damping and baffling insulation liner disposed alone the most all or the entire interior surface area of the hard and rigid outer shell.

In various embodiments, the noise suppression pans 204 include at least two noise suppression pans 204, wherein at least one noise suppression pan 204 is disposed beneath and around at least a portion of the powertrain 10, and at least one noise suppression pan 204 is disposed beneath the seating structure 50 of the vehicle.

The description herein is merely exemplary in nature and, thus, variations that do not depart from the gist of that which is described are intended to be within the scope of the teachings. Moreover, although the foregoing descriptions and the associated drawings describe example embodiments in the context of certain example combinations of elements and/or functions, it should be appreciated that different combinations of elements and/or functions can be provided by alternative embodiments without departing from the scope of the disclosure. Such variations and alternative combinations of elements and/or functions are not to be regarded as a departure from the spirit and scope of the teachings.

What is claimed is:

1. A transaxle system for a utility vehicle, said system comprising:
   a transaxle, the transaxle comprising:
   a plurality of mounting flanges fixedly mountable to at least one axle tube of the vehicle, the at least one axle tube housing at least one wheel axle, the transaxle operably couplable to the at least one wheel axle; and
   an annular transaxle mounting collar that is one of fixedly mounted to or integrally formed with a housing of the transaxle; and
   a mating interface that is mountable to the annular transaxle mounting collar, the mating interface structured and operable to:
   have a prime mover of the vehicle mounted thereto such that the annular mating interface is interstitially disposed between the annular transaxle mounting collar and the prime mover, and
   support the prime mover such that the prime mover is mountable to the vehicle via only the mating interface, the annular transaxle mounting collar and the transaxle such that the prime mover can be cantilevered from the transaxle.

2. The system of claim 1, wherein the mating interface comprises a mounting plate to which the transaxle mounting collar is mountable and a sidewall extending from the mounting plate, wherein the sidewall includes a mounting face disposed along a distal edge thereof to which the internal combustion engine-transmission unit is mountable.

3. The system of claim 2, wherein the mating interface further comprises shaft aperture that is structured and operable to have one of a transaxle input shaft and an internal combustion engine-transmission unit output shaft extend therethrough such that the transaxle input shaft and internal combustion engine-transmission unit output shaft are connectable having a respective longitudinal axis of each substantially parallel to a longitudinal axis of the at least one wheel axle when the transaxle is mounted to the at least one axle tube.

4. The system of claim 3, wherein the plurality of mounting flanges are structured to fixedly mount to the at least one axle tube such that the longitudinal axis of the transaxle input shaft and internal combustion engine-transmission unit output shaft is located forward of a longitudinal axis of the at least one wheel axle.

5. The system of claim 2, wherein the mating interface further comprises shaft aperture, a bearing stand disposed around the shaft aperture that is structured and operable to receive and retain a shaft bearing, and a coupling shaft disposed therewithin, the coupling shaft having a first end to which a transaxle input shaft is engageable and an opposing second end to which an internal combustion engine-transmission unit output shaft is engageable such that the transaxle input shaft and internal combustion engine-transmission unit output shaft are connectable having a respective longitudinal axis of each, and a longitudinal axis of the coupling shaft substantially parallel to a longitudinal axis of the at least one wheel axle when the transaxle is mounted to the at least one axle tube.

6. The system of claim 5 wherein the plurality of mounting flanges are structured to fixedly mount to the at least one axle tube such that longitudinal axis of the transaxle input shaft, the internal combustion engine-transmission unit output shaft, and the coupling interface are located forward of a longitudinal axis of the at least one wheel axle.

7. A unitized powertrain for a utility vehicle, said unitized powertrain comprising:
a prime mover;
an integrated transaxle-mounting collar unit, the integrated transaxle-mounting collar unit comprising:
a transaxle;
a plurality of mounting flanges connected to the transaxle and fixedly mountable to at least one axle tube of the vehicle, the at least one axle tube housing at least one wheel axle, the transaxle operably couplable to the at least one wheel axle; and
an annular transaxle mounting collar that is one of fixedly mounted to or integrally formed with a housing of the transaxle; and
a mating interface that is mountable to the annular transaxle mounting collar, the mating interface structured and operable to:
have a prime mover of the vehicle mounted thereto such that the annular mating interface is interstitially disposed between the annular transaxle mounting collar and the prime mover, and
support the prime mover such that the prime mover is mountable to the vehicle via only the mating interface, the annular transaxle mounting collar and the transaxle such that the prime mover can be cantilevered from the transaxle.

8. The powertrain of claim 7, wherein the at least one axle tube comprises a left axle tube and a right axle tube, wherein one of the left and right axle tubes is longer than the other such that transaxle is mountable thereto offset from a vehicle longitudinal centerline.

9. The powertrain of claim 7, wherein the mating interface further comprises shaft aperture that is structured and operable to have one of a transaxle input shaft and an internal combustion engine-transmission unit output shaft extend therethrough and be directly connected to the respective transaxle input shaft or internal combustion engine-transmission unit output shaft such that a longitudinal axis of the directly connected transaxle input shaft and internal combustion engine-transmission unit output shaft is substantially parallel to a longitudinal axis of the at least one wheel axle when the transaxle is mounted to the at least one axle tube.

10. The powertrain of claim 9, wherein the plurality of mounting flanges are structured to fixedly mount to the at least one axle tube such that the longitudinal axis of the transaxle input shaft and internal combustion engine-transmission unit output shaft is located forward of a longitudinal axis of the at least one wheel axle.

11. The powertrain of claim 7, wherein the mating interface further comprises shaft aperture, a bearing stand disposed around the shaft aperture having a shaft bearing retained therein, and a coupling shaft disposed therewithin the bearing, the coupling shaft having a first end to which a transaxle input shaft is engaged and an opposing second end to which an internal combustion engine-transmission unit output shaft is engaged such that the transaxle input shaft and internal combustion engine-transmission unit output shaft are operably connected having a respective longitudinal axis of each, and a longitudinal axis of the coupling shaft substantially parallel to a longitudinal axis of the at least one wheel axle when the transaxle-mounting collar unit is mounted to the at least one axle tube.

12. The powertrain of claim 11 wherein the plurality of mounting flanges are structured to fixedly mount to the at least one axle tube such that longitudinal axis of the transaxle input shaft, the internal combustion engine-transmission unit output shaft, and the coupling interface are located forward of a longitudinal axis of the at least one wheel axle.

13. The powertrain of claim 7, wherein the mating interface sidewall is structured and operable such that unitized powertrain is a sealed powertrain.

14. A utility vehicle, said vehicle comprising:
a chassis;
a pair of vehicle suspension components connected to the chassis;
a drive axle assembly, the drive axle assembly comprising:
at least one wheel axle; and
at least one axle tube housing the at least one wheel axle, the at least one axle tube connected to the suspension components such that the at least one axle assembly is operably connected to the vehicle chassis via the vehicle suspension components; and
a unitized powertrain mounted to the chassis via the suspension components, the unitized powertrain comprising:
a prime mover;
an integrated transaxle-mounting collar unit, the integrated transaxle-mounting collar unit comprising:
a transaxle;
a plurality of mounting flanges connected to the transaxle and fixedly mountable to at least one axle tube of the vehicle, the at least one axle tube housing at least one wheel axle, the transaxle operably couplable to the at least one wheel axle; and
an annular transaxle mounting collar that is one of fixedly mounted to or integrally formed with a housing of the transaxle; and
a mating interface that is mountable to the annular transaxle mounting collar, the mating interface structured and operable to:
have a prime mover of the vehicle mounted thereto such that the annular mating interface is interstitially disposed between the annular transaxle mounting collar and the prime mover, and
support the prime mover such that the prime mover is mountable to the vehicle via only the mating interface, the annular transaxle mounting collar and the transaxle such that the prime mover can be cantilevered from the transaxle.

15. The vehicle of claim 14, wherein the mating interface further comprises shaft aperture that is structured and operable to have one of a transaxle input shaft and an internal combustion engine-transmission unit output shaft extend therethrough and be directly connected to the respective transaxle input shaft or internal combustion engine-transmission unit output shaft such that a longitudinal axis of the directly connected transaxle input shaft and internal combustion engine-transmission unit output shaft is substantially parallel to a longitudinal axis of the at least one wheel axle when the transaxle-mounting collar unit is mounted to the at least one axle tube.

16. The vehicle of claim 15, wherein the plurality of mounting flanges are structured to fixedly mount to the at least one axle tube such that the longitudinal axis of the transaxle input shaft and internal combustion engine-transmission unit output shaft is located forward of a longitudinal axis of the at least one wheel axle.

17. The vehicle of claim 15, wherein the mating interface sidewall is structured and operable such that unitized powertrain is a sealed powertrain.

18. The vehicle of claim 14, wherein the mating interface further comprises shaft aperture, a bearing stand disposed around the shaft aperture having a shaft bearing retained therein, and a coupling shaft disposed therewithin the bearing, the coupling shaft having a first end to which a transaxle input shaft is engaged and an opposing second end to which an internal combustion engine-transmission unit output shaft is engaged such that the transaxle input shaft and internal combustion engine-transmission unit output shaft are operably connected having a respective longitudinal axis of each, and a longitudinal axis of the coupling shaft substantially parallel to a longitudinal axis of the at least one wheel axle when the transaxle-mounting collar unit is mounted to the at least one axle tube.

19. The vehicle of claim 18 wherein the plurality of mounting flanges are structured to fixedly mount to the at least one axle tube such that longitudinal axis of the transaxle input shaft, the internal combustion engine-transmission unit output shaft, and the coupling interface are located forward of a longitudinal axis of the at least one wheel axle.

* * * * *